(12) United States Patent
Mimatsu

(10) Patent No.: US 8,086,634 B2
(45) Date of Patent: Dec. 27, 2011

(54) METHOD AND APPARATUS FOR IMPROVING FILE ACCESS PERFORMANCE OF DISTRIBUTED STORAGE SYSTEM

(75) Inventor: Yasuyuki Mimatsu, Cupertino, CA (US)

(73) Assignee: Hitachi, Ltd., Tokyo (JP)

( * ) Notice: Subject to any disclaimer, the term of this patent is extended or adjusted under 35 U.S.C. 154(b) by 601 days.

(21) Appl. No.: 12/246,520

(22) Filed: Oct. 7, 2008

(65) Prior Publication Data
US 2010/0088335 A1    Apr. 8, 2010

(51) Int. Cl.
*G06F 17/30* (2006.01)
(52) U.S. Cl. .................................. 707/782; 707/784
(58) Field of Classification Search .......... 707/713–722, 707/780–788
See application file for complete search history.

(56) References Cited

U.S. PATENT DOCUMENTS

| | | | |
|---|---|---|---|
| 7,155,466 B2 | 12/2006 | Rodriguez et al. ..... | 707/999.002 |
| 2002/0078174 A1 | 6/2002 | Sim et al. | |
| 2003/0046335 A1 | 3/2003 | Doyle et al. | |
| 2003/0074540 A1 * | 4/2003 | Arimilli et al. ............... | 711/204 |
| 2003/0191822 A1 * | 10/2003 | Leighton et al. ............. | 709/219 |
| 2004/0267830 A1 | 12/2004 | Wong et al. | |
| 2005/0120025 A1 | 6/2005 | Rodriguez et al. | |
| 2006/0026344 A1 * | 2/2006 | Sun Hsu et al. ............... | 711/113 |
| 2006/0036808 A1 * | 2/2006 | Intrater et al. ................ | 711/123 |
| 2007/0022087 A1 | 1/2007 | Bahar et al. | |
| 2007/0283356 A1 * | 12/2007 | Du et al. ....................... | 718/102 |
| 2008/0221987 A1 * | 9/2008 | Sundaresan et al. ........... | 705/14 |

* cited by examiner

*Primary Examiner* — Wilson Lee
(74) *Attorney, Agent, or Firm* — Mattingly & Malur, PC

(57) ABSTRACT

Embodiments of the invention provide methods and apparatus for improving the performance of file transfer to a client from a distributed storage system which provides single name space to clients. In one embodiment, a system for providing access to files in a distributed storage system comprises a plurality of storage nodes and at least one computer device connected via a network. Each storage node is configured, upon receiving a file access request for a file from one of the at least one computer device as a receiver storage node, to determine whether or not to inform the computer device making the file access request to redirect the file access request to an owner storage node of the file according to a preset policy. The preset policy defines conditions for whether to redirect the file access request based on at least one of file type or file size of the file.

20 Claims, 26 Drawing Sheets

1004

1001

4008

| Client ID | File type | File size | External path | Request params | Redirect |
|---|---|---|---|---|---|
| XXX | * | * | * | * | No |
| * | .mpg | * | * | * | Yes |
| * | * | * | /large/files/* | X-Redirect=Yes | Yes |
| * | * | > 10MB | * | X-Redirect=Yes | Yes |
| ... | | | | | |

| External path | Size | Owner node |
|---|---|---|
| /dirA/text.txt | 1KB | 3 |
| /dirB/movie.mpg | 500MB | 1 |
| ... | | |

Fig. 7

11014  Process flow of prefetch request

4010

| External path | Owner node | Redirection flag |
|---|---|---|
| /dirA/text.txt | 3 | NO |
| /dirB/movie.mpg | 1 | YES |
| ... | | |

| External path | Size | Portion path | Range | Owner node |
|---|---|---|---|---|
| /dirA/movie.mpg | 500MB | /dirA/movie(1).mpg | 0-50MB | 3 |
| | | /dirA/movie(2).mpg | 50-100MB | 1 |
| | | /dirA/movie(3).mpg | 100-150MB | 4 |
| | | /dirA/movie(4).mpg | 150-200MB | 2 |
| | | ... | | |
| /dirB/text.txt | 1KB | /dirB/text(1).txt | 0-1KB | 1 |
| ... | | | | |

Fig. 22

METHOD AND APPARATUS FOR IMPROVING FILE ACCESS PERFORMANCE OF DISTRIBUTED STORAGE SYSTEM

BACKGROUND OF THE INVENTION

The present invention relates generally to methods and apparatus for processing I/O requests in computer storage systems and, more particularly, to methods and apparatus which improve the file access performance of a distributed storage system that provides single name space to clients.

Some of today's computer storage systems are distributed systems having a number of storage nodes. Each node has a processing unit to process requests from clients or other nodes, a communication unit to send information to and receive information from clients or other nodes, and a storage unit to store data or management information. The nodes communicate with each other via a network and work as a single system. A distributed storage system has several advantages. For example, it has good scalability by adding nodes. It also provides good parallelism of process by distributing workload to a plurality of nodes. One example of distributed storage systems is disclosed in U.S. Pat. No. 7,155,466.

When the distributed storage system provides a file system to clients, it often organizes its storage capacity in single name space, which means a client gets an identical view regardless of the node or network port to which it is connected. To achieve single name space, nodes send and receive files among themselves. For example, when a node ("receiver node") receives a request to read a file from a client and the file is not stored in the node, it identifies another node ("owner node") that stores the file, requests the owner node to send the file to the receiver node, and sends the file to the client. The capability of single name space allows clients to access files in any nodes even if the client communicates with only one node, and simplifies the configuration management of the clients.

From the view point of performance, particularly throughput, however, the inter-node communication to provide single name space capability produces additional overhead of the I/O process. If a file is stored in a node which receives an access request from a client, there is no overhead because it is immediately retrieved and sent to the client directly by the receiver. On the other hand, if the file is stored in another node, it must be read by the owner node, transferred to the receiver node, and then sent to the client. In this case, the file is transferred through four NICs (network interface cards): the owner node's NIC, the receiver node's NIC which receives the file, the receiver node's NIC which sends the file to the client, and the client's NIC. Each time the file is processed through an NIC, it goes through the communication protocol stack which causes memory copy, encapsulation of data to be sent, and reorganization of data received. Particularly if the size of a file transferred is large (e.g., gigabytes), the additional overhead makes the time to transfer it long compared with the case in which a client receives a file directly from its owner node. On the other hand, if the size is small (e.g., kilobytes), the overhead does not have much effect because the transfer time is short.

BRIEF SUMMARY OF THE INVENTION

Embodiments of the invention provide methods and apparatus for improving the performance of file transfer to a client from a distributed storage system which provides single name space to clients. Each node in the distributed storage system has the capability to determine a path from a client to a file based on predetermined policy or policies and to provide the path information to the client. If a node receives a file access request from a client, it identifies the owner node of the file. If the receiver node is the owner, it sends the file to the client. Otherwise, it determines a path through which the client should access the file based on the predetermined policy. The path may involve redirection of the file from the owner node of the file to the client. Although the redirection reduces the overhead after file transfer starts, it is not always desirable to do so because the redirection increases the latency, i.e., the overhead before file transfer starts. The policy defines the conditions for making redirections. For example, the policy can be defined by the size of a file to be accessed. If the size is smaller than a predetermined threshold, the receiver node receives the file from the owner node of the file and sends it to the client. Otherwise, the receiver node tells the client to access to the owner node directly because that decreases the overhead and makes the transfer time shorter. If the clients and the storage system communicate by HTTP (see RFC 2616, "Hyper Text Transfer Protocol—HTTP/1.1," http://www.ietf.org/rfc/rfc2616.txt), the switch of the path can be achieved by using a standard redirection mechanism.

In accordance with an aspect of the present invention, a system for providing access to files in a distributed storage system comprises a plurality of storage nodes and at least one computer device connected via a network. Each storage node is configured, upon receiving a file access request for a file from one of the at least one computer device as a receiver storage node, to determine whether or not to inform the computer device making the file access request to redirect the file access request to an owner storage node of the file according to a preset policy. The preset policy defines conditions for whether to redirect the file access request based on at least one of file type or file size of the file.

In some embodiments, the receiver storage node is configured, in redirecting the file access request to the owner storage node, to send a prefetch request to the owner storage node specifying the file to be prefetched in cache. The receiver storage node determines whether or not to inform the computer device making the file access request to redirect the file access request to the owner storage node by looking up a policy table which specifies the conditions for whether to redirect the file access request based on at least one of file type or file size of the file. The conditions are based on both the file type and the file size of the file, and further based on at least one of the computer device requesting the file, an external path of the file, or at least one request parameter specified in the file access request. The policy table is stored in each of the storage nodes.

In specific embodiments, the receiver storage node determines whether or not to inform the computer device making the file access request to redirect the file access request to the owner storage node by looking up a redirection flag for the file. The redirection flag specifies, for each file stored in the storage nodes, whether a file access request for the file associated therewith is to be redirected. The redirection flag is set by performing the following at the time when a file is written into one of the storage nodes: determining whether or not to redirect a file access request to an owner storage node of the file according to the preset policy based on at least one of the file type or the file size of the file; and setting the redirection flag to redirect or not to redirect according to the determining step.

In some embodiments, the file of the file access request is divided into multiple portions and stored in a plurality of the storage nodes. Each storage node is configured, as the receiver storage node, to determine whether or not to inform the computer device making the file access request to redirect the file access request to owner storage nodes of the multiple portions of the file according to the preset policy. The receiver storage node is configured, in redirecting the file access request to the owner storage nodes of the multiple portions of the file, to send a prefetch request to each owner storage node, other than the receiver storage node, specifying the portion of the file to be prefetched in cache. Each storage node is configured, upon receiving a migration request to migrate a file to a destination storage node, to extract an external path of the file to be migrated, read the file from an origination storage node, send an internal write request which includes the file and the external path of the file to the destination storage node, delete the migrated file from the origination storage node, and update a location record of the migrated file within the distributed storage system.

In specific embodiments, the receiver storage node is configured, in not redirecting the file access request to the owner storage node, to read the file from the owner storage node and send the read file to the computer device making the file access request. The preset policy may define conditions for whether to redirect the file access request based on at least one of the file type of the file, the file size of the file, the computer device requesting the file, an external path of the file, or at least one request parameter specified in the file access request.

Another aspect of the invention is directed to a system having a distributed storage system and at least one computer device connected via a network. A method of providing access to files in a plurality of storage nodes in the distributed storage system comprises, upon receiving a file access request for a file from one of the at least one computer device, determining whether or not to inform the computer device making the file access request to redirect the file access request to an owner storage node of the file according to a preset policy. The preset policy defines conditions for whether to redirect the file access request based on at least one of file type or file size of the file.

These and other features and advantages of the present invention will become apparent to those of ordinary skill in the art in view of the following detailed description of the preferred embodiments.

BRIEF DESCRIPTION OF THE DRAWINGS

FIG. 5 illustrates an exemplary policy table in the storage node of FIG. 4.

FIG. 7 illustrates an exemplary file table in the storage node of FIG. 4.

FIG. 18 illustrates an exemplary file table according to a second embodiment of the invention.

FIG. 22 illustrates an exemplary file table in the storage node according to a third embodiment of the invention.

DETAILED DESCRIPTION OF THE INVENTION

Figure 1:
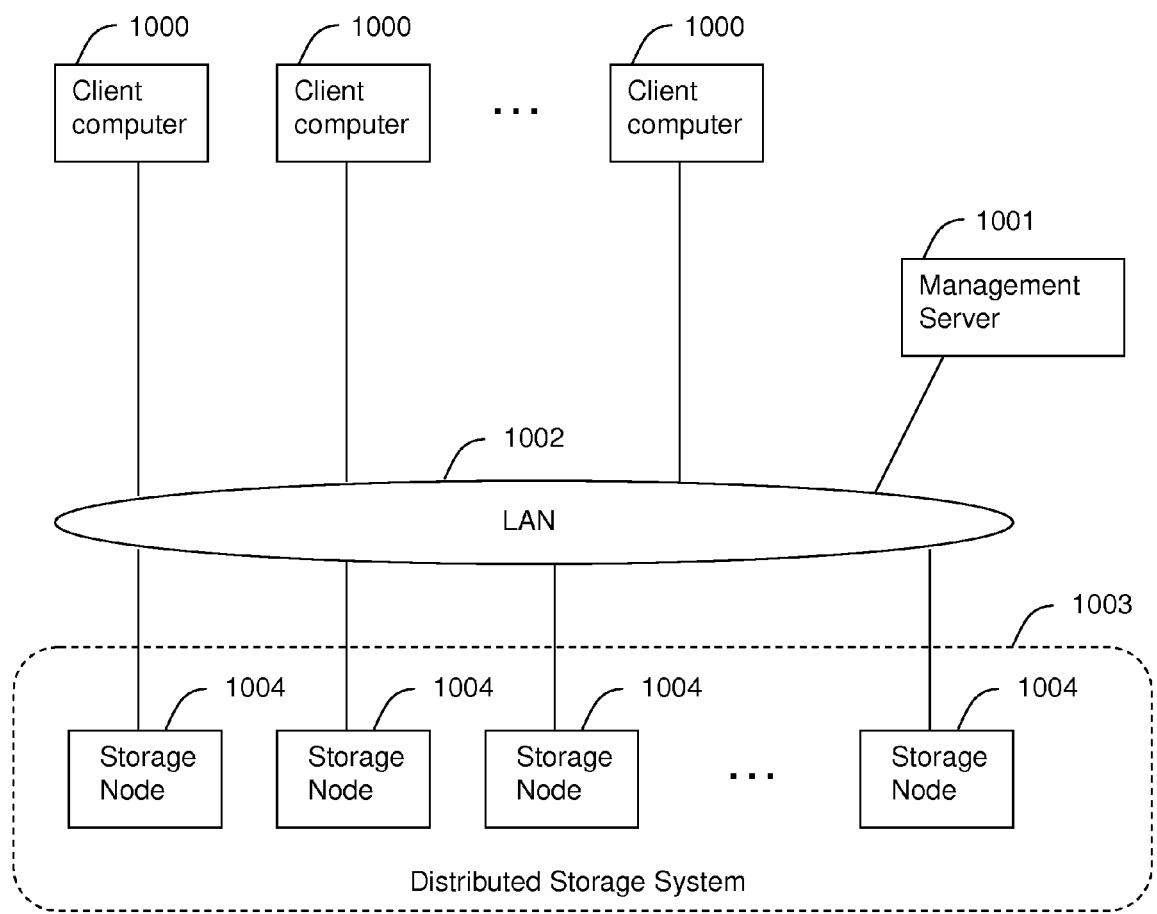
FIG. 1 illustrates an example of a computer system in which the method and apparatus of the invention may be applied.

In the following detailed description of the invention, reference is made to the accompanying drawings which form a part of the disclosure, and in which are shown by way of illustration, and not of limitation, exemplary embodiments by which the invention may be practiced. In the drawings, like numerals describe substantially similar components throughout the several views. Further, it should be noted that while the detailed description provides various exemplary embodiments, as described below and as illustrated in the drawings, the present invention is not limited to the embodiments described and illustrated herein, but can extend to other embodiments, as would be known or as would become known to those skilled in the art. Reference in the specification to "one embodiment", "this embodiment", or "these embodiments" means that a particular feature, structure, or characteristic described in connection with the embodiment is included in at least one embodiment of the invention, and the appearances of these phrases in various places in the specification are not necessarily all referring to the same embodiment. Additionally, in the following detailed description, numerous specific details are set forth in order to provide a thorough understanding of the present invention. However, it will be apparent to one of ordinary skill in the art that these specific details may not all be needed to practice the present invention. In other circumstances, well-known structures, materials, circuits, processes and interfaces have not been described in detail, and/or may be illustrated in block diagram form, so as to not unnecessarily obscure the present invention.

Exemplary embodiments of the invention, as will be described in greater detail below, provide apparatuses, methods and computer programs for improving the performance of file transfer to a client from a distributed storage system which provides single name space to clients.

FIG. 1 illustrates an example of a computer system in which the method and apparatus of the invention may be applied. A plurality of client computers 1000 and a management server 1001 are connected via a network 1002 such as an LAN to a distributed storage system 1003 which includes a plurality of storage nodes 1004. In this embodiment, the clients 1000 and the distributed storage system 1003 communicate by HTTP. The storage system 1003 stores files in its nodes 1004. Each file is stored in one of the nodes 1004. When a node 1004 receives a request from a client 1000, it determines a path from the client 1000 to the file requested based on predetermined policy or policies. If it is determined to switch or redirect the path, the redirection is achieved by returning one of HTTP response codes which tells the client to access another node, namely, the owner node of the requested file. If the receiver node which receives the file access request redirects the request to the owner node, the receiver node also tells the owner node to prefetch the file to cache memory in order to improve latency and throughput. In addition, a user can instruct the storage system 1003 to migrate a file stored in one node to another node from the management server 1001. After the migration, the storage system 1003 informs a client requesting access to the file a new path associated with the current file location.

Figure 2:
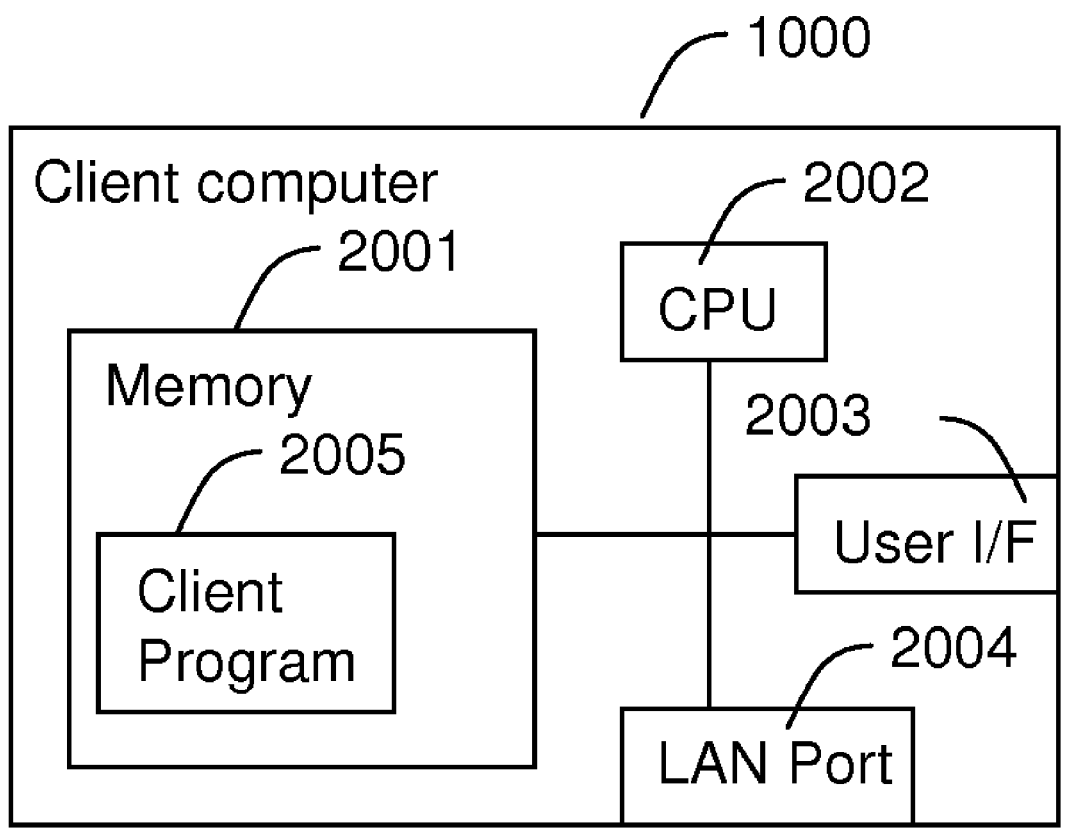
FIG. 2 illustrates an example of a client computer in the computer system of FIG. 1.

FIG. 2 illustrates an example of a client computer 1000 in the computer system of FIG. 1. The CPU 2002 executes the client program 2005 in the memory 2001. The client program 2005 communicates with the storage system 1003 via the LAN port 2004 to read and write files by sending HTTP requests and receiving HTTP responses.

Figure 3:
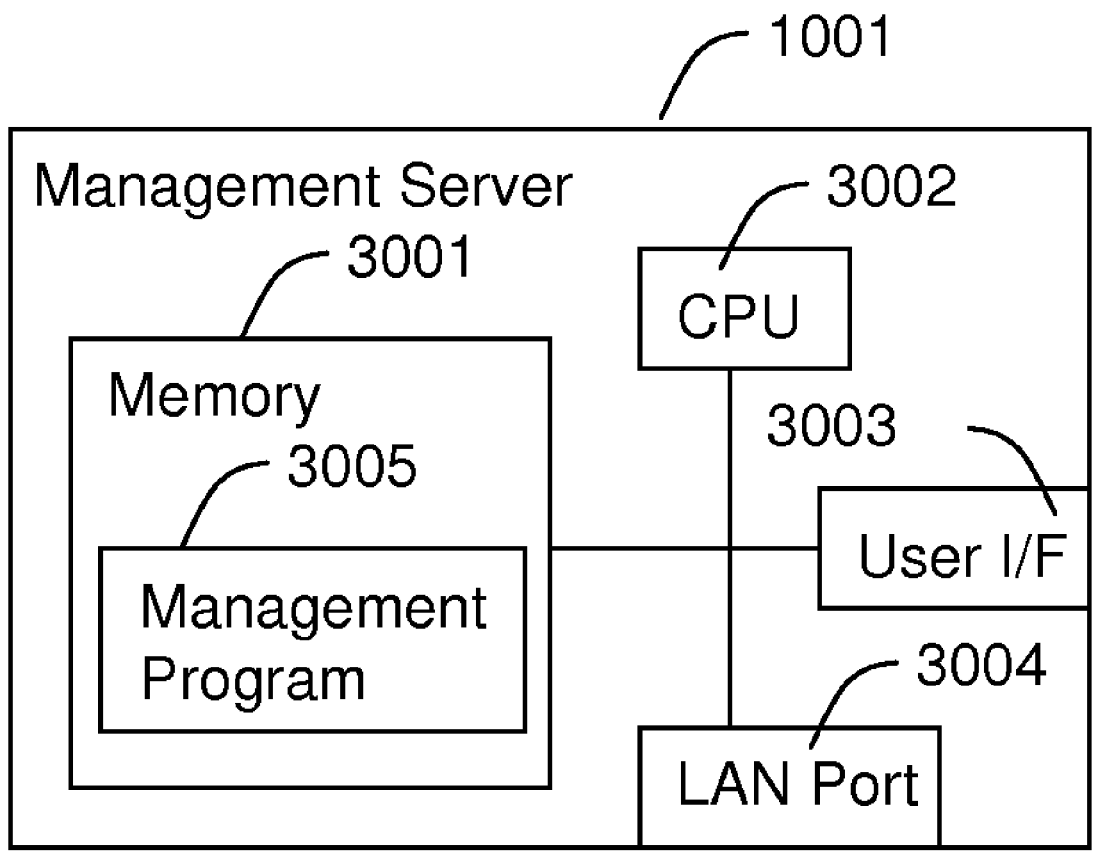
FIG. 3 illustrates an example of a management server in the computer system of FIG. 1.

FIG. 3 illustrates an example of a management server 1001 in the computer system of FIG. 1. The management program 3005 in the memory 3001 is executed by the CPU 3002 to allow a user to view and change the settings of the storage system 1003 via the user interface 3003.

Figure 4:
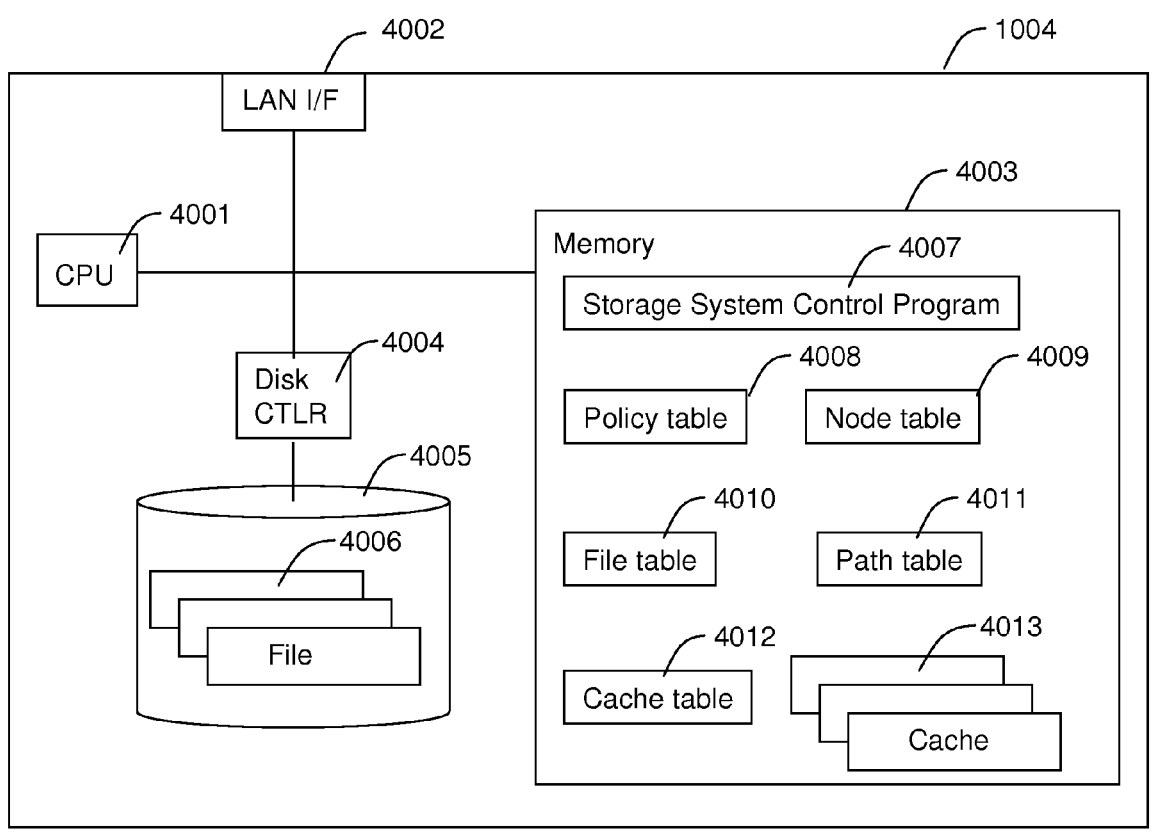
FIG. 4 illustrates an example of a storage node in the distributed storage system of the computer system of FIG. 1 according to a first embodiment of the invention.

FIG. 4 illustrates an example of a storage node 1004 in the distributed storage system 1003 of the computer system of FIG. 1 according to a first embodiment of the invention. Each node 1004 has a LAN I/F 4002 to communicate with clients and other nodes. It also has a storage area 4005 to store files 4006. The storage area 4005 typically consists of disk drives controlled by a disk controller 4004. The CPU 4001 executes a storage system control program 4007 in the memory 4003. The storage system control program 4007 processes not only I/O requests sent from client computers 1000 but also management requests sent from the management server 1001 and internal requests sent from other nodes. The memory 4003 includes several tables 4008-4012 which contain management information and cache 4013 which stores files in memory.

FIG. 5 illustrates an exemplary policy table 4008 in the storage node of FIG. 4. Each row in the table defines a policy to determine whether to redirect the path for accessing a file from a client to the owner node of the file. Columns 5001-5005 contain conditions for making the determination and column 5006 specifies whether or not the access should be redirected, i.e., the access path should be switched to the owner node of the file. When the storage system control program 4007 receives a request to read a file, it checks the conditions of the request. If a matched policy is found in a row of the policy table 4008, the storage system control program 4007 proceeds in accordance with the redirect information in column 5006.

Column 5001 contains the ID of the client 1000 which sends the request. For example, the ID can be the IP address of the client computer. If application programs in a client computer do not support HTTP redirection, the IP address of the client can be specified in this column with a "No" entry in column 5006 so that a redirection response is not returned to the client computer. Column 5002 contains the type of the requested file. The type can be determined, for example, by referring to the extension of file name. Column 5003 contains the condition regarding the size of the requested file. Column 5004 contains the condition regarding the path of the requested file. For example, "/large/files/" matches any file stored in a directory named /large/files or one of its subdirectories. Column 5005 contains the condition regarding one or more request parameters which are specified in HTTP request header sent from the client. For example, "X-Redirect=Yes" matches any request with a header field named "X-Redirect" and its value "Yes." This column can also be used to classify clients which support redirection. An entry of "*" recorded in any of columns 5001-5005 means no condition is defined, i.e., any request satisfies the condition. If a request satisfies all of conditions recorded in columns 5001-5005 in a single row, the policy recorded in column 5006 is applied to the request. A "Yes" entry in column 5006 means the request should be redirected. A "No" entry means it should not.

Figure 6:
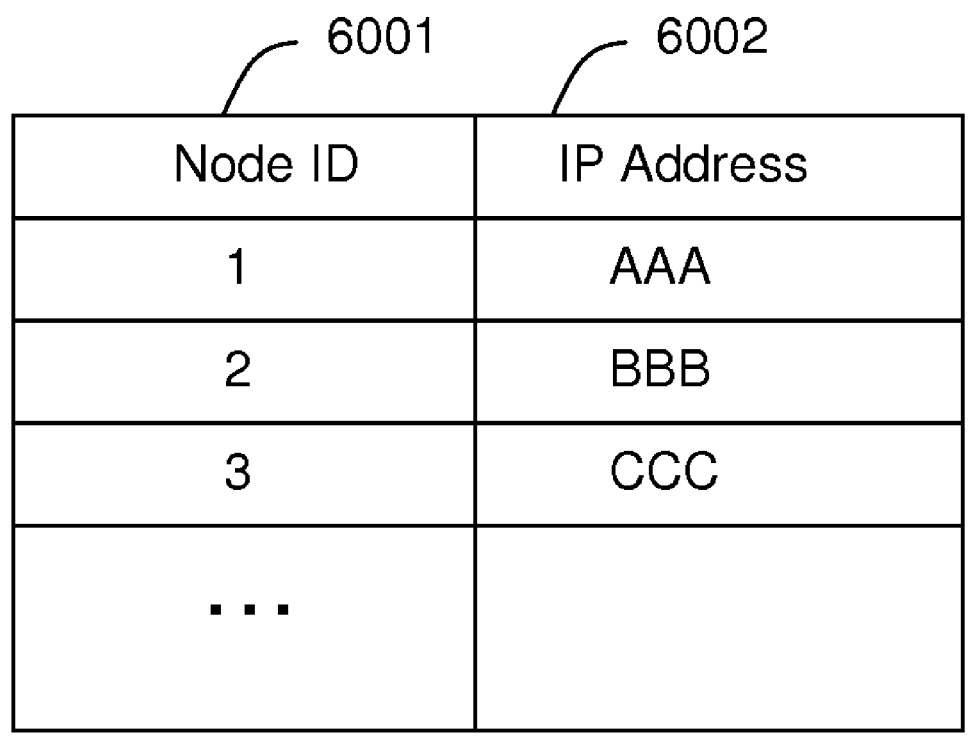
FIG. 6 illustrates an exemplary node table in the storage node of FIG. 4.

FIG. 6 illustrates an exemplary node table 4009 in the storage node of FIG. 4. Each line contains an ID of a node 1004 in the storage system 1003 (column 6001) and an IP address of its LAN I/F 4002 (column 6002). A node can identify other nodes in the network by referring to this table. If a node is added to or removed from the storage system, an entry of the node is added to or removed from the table. Any suitable process can be used to maintain the table as known to those of skill in the art.

FIG. 7 illustrates an exemplary file table 4010 in the storage node of FIG. 4. It contains information regarding all the files stored in the storage system 1003. Each row contains an external path entry 7001, the size of the file entry 7002, and the ID of its owner node entry 7003.

Figure 8:
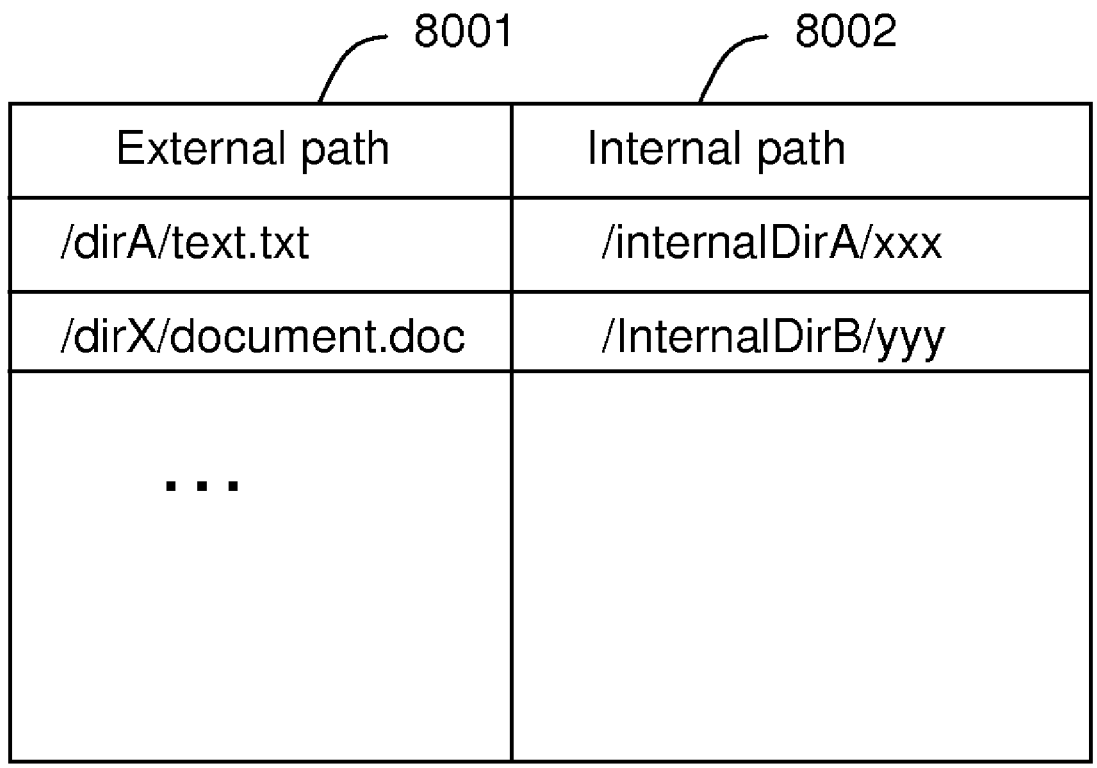
FIG. 8 illustrates an exemplary path table in the storage node of FIG. 4.

FIG. 8 illustrates an exemplary path table 4011 in the storage node 1004 of FIG. 4. It contains information regarding the mapping between an external file path in column 8001 and an internal file path in column 8002 for each file stored in a node 1004. For example, as seen in FIGS. 7 and 8, a file exposed to clients as /dirA/text.txt is stored in the storage area of node 3 as an internal file /internalDirA/xxx.

Figure 9:
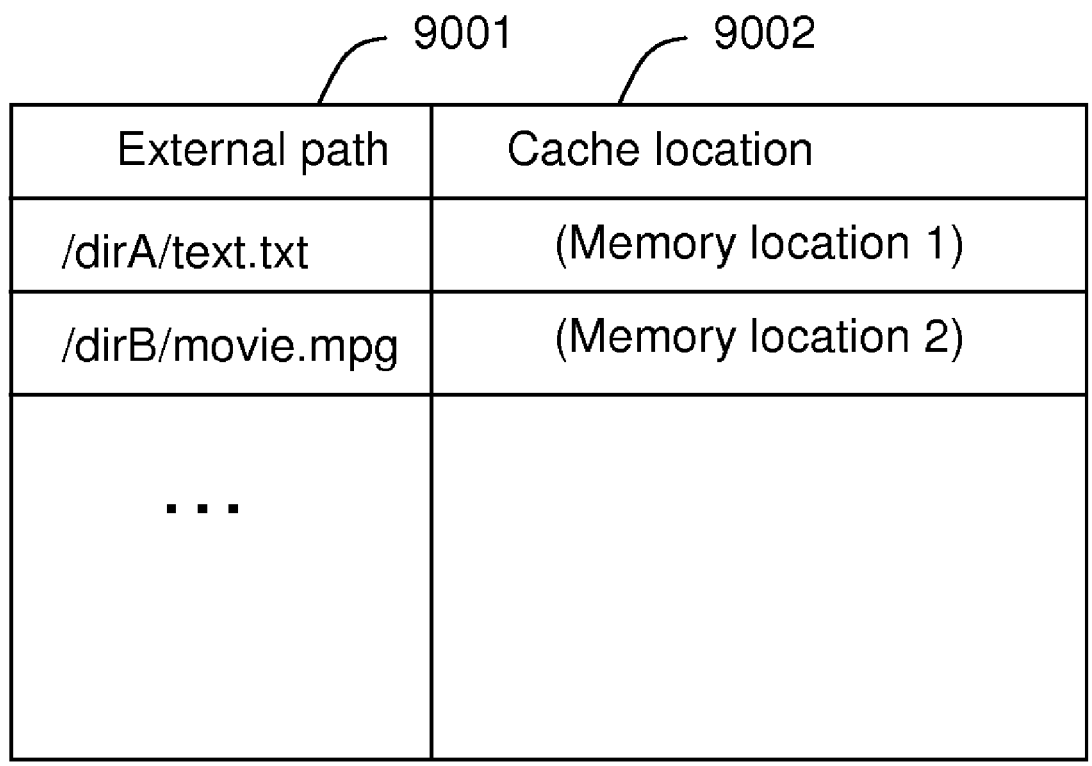
FIG. 9 illustrates an exemplary cache table in the storage node of FIG. 4.

FIG. 9 illustrates an exemplary cache table 4012 in the storage node 1004 of FIG. 4. It contains information regarding files cached in memory. Each row contains an external path entry 9001 of the cached file and its location in the memory entry 9002.

Figure 10:
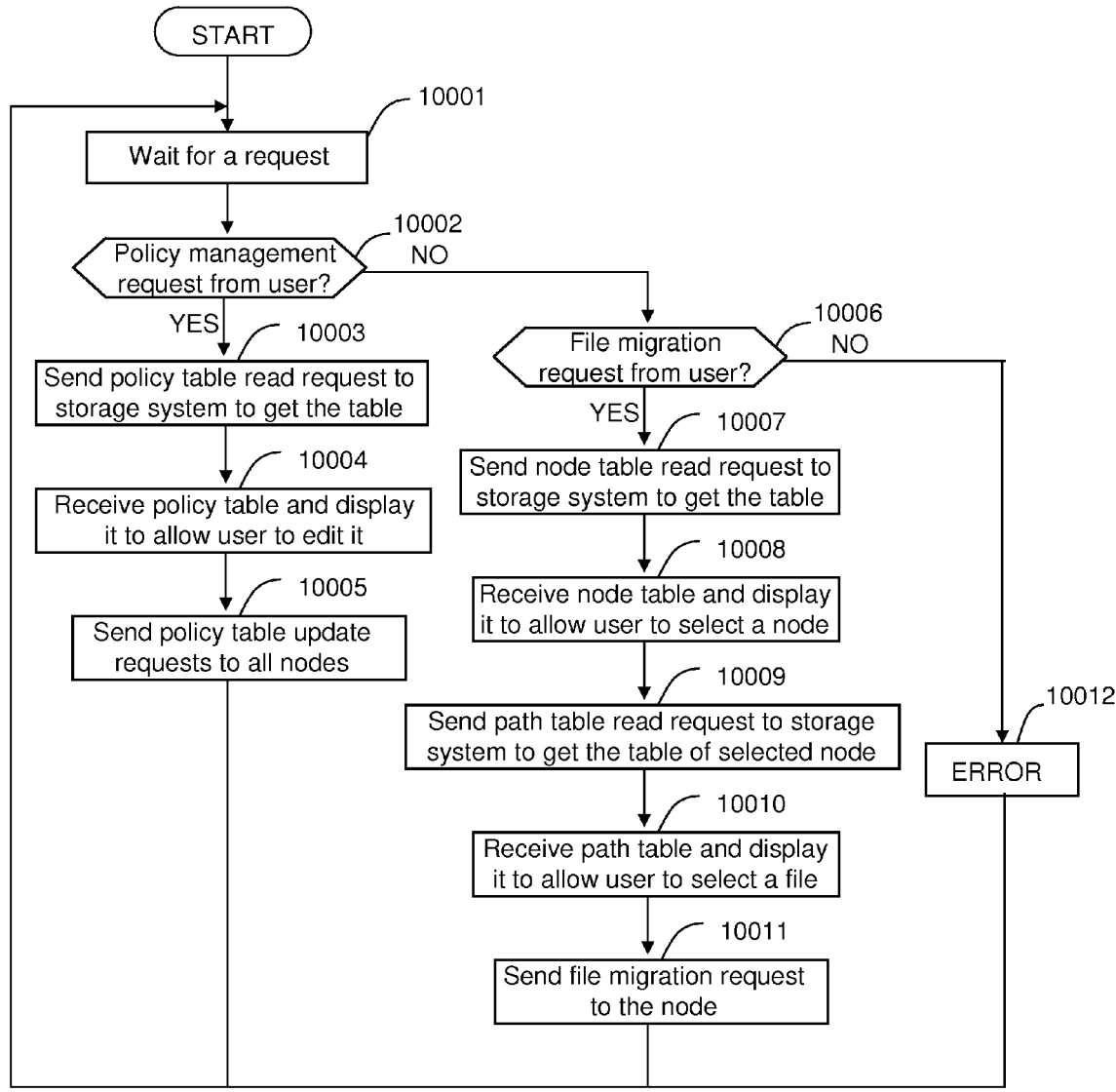
FIG. 10 illustrates an example of a process flow by the management program in the management server of FIG. 3.

FIG. 10 illustrates an example of a process flow by the management program 3005 in the management server 1001 of FIG. 3. The process flow in the embodiment shown involves policy management and file migration. At first, it receives a request from a user via the user interface 3003 (step 10001). If the received request is a policy management request (step 10002), the management program 3005 sends a policy table read request to one of the nodes 1004 in the storage system 1003 (step 10003), and receives the policy table 4008 and displays information contained therein (step 10004). After the user edits the information, the management program 3005 updates the policies in the storage system 1003 by sending a policy table update request to all the nodes 1004 (step 10005). The policy tables 4008 in all the nodes 1004 are identical. In this embodiment, for simplicity, the management program 3005 also receives the node table 4009 and sends the policy table update request to each node recorded in node table to update all policy tables in all nodes 1004.

If the received request is a file migration request (step 10006), the management program 3005 sends a node table read request to one of nodes 1004 in the storage system 1003 (step 10007), and receives the node table 4009 and displays the list of nodes to allow the user to select a node (step 10008). After the user selects a node 1004, the management program 3005 sends a path table read request to the selected node (step 10009), and receives the path table 4011 of the selected node and displays the list of files stored in the selected node to allow user to select a file to be migrated (step 10010). After the user selects a file to be migrated and a destination node, the management program 3005 sends a file migration request to the node selected in step 10008 (step 10011). If the request is neither a policy management request nor a file migration request, the management program 3005 returns an error message to the requester (step 10012).

Figure 11:
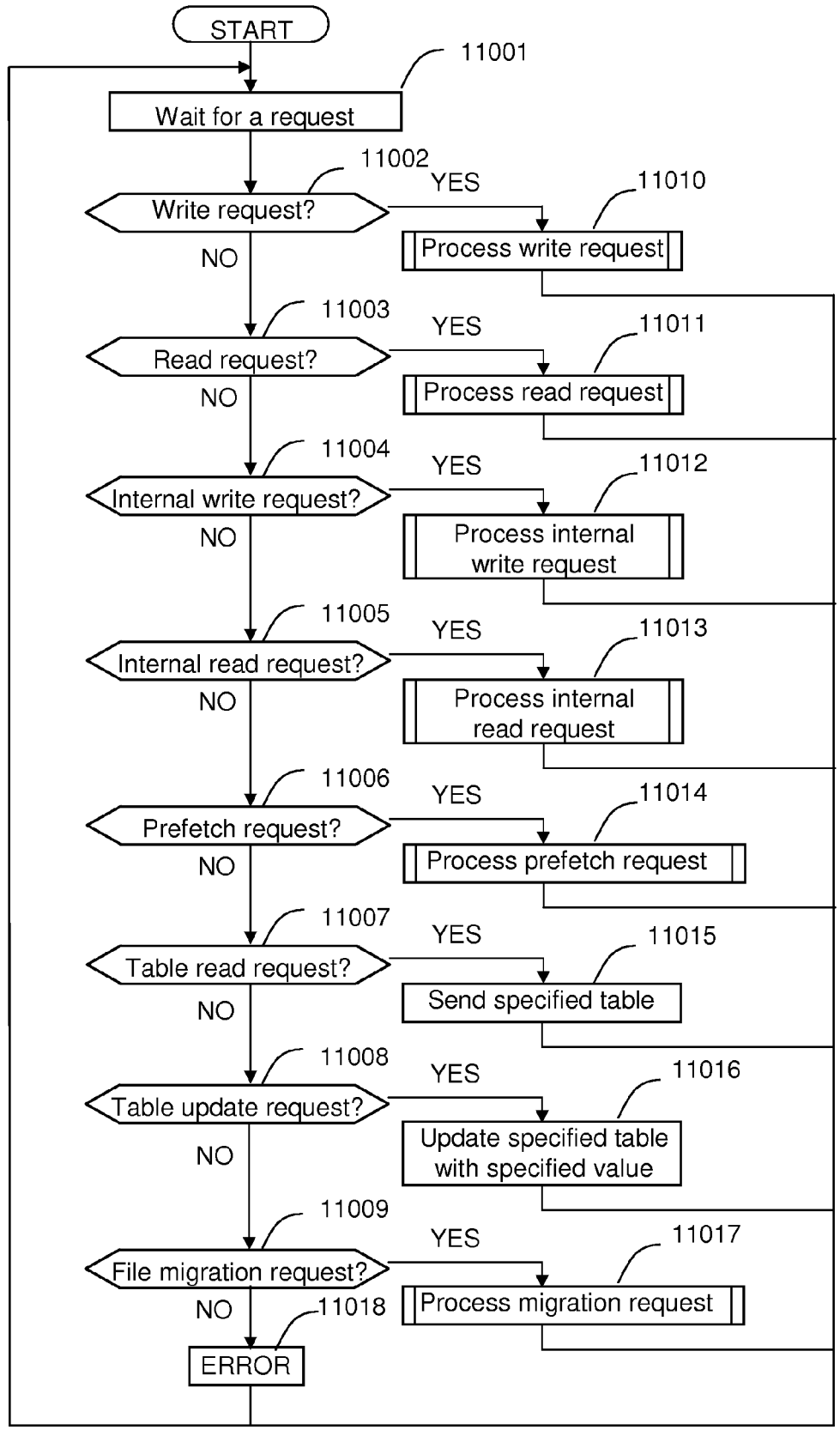
FIG. 11 illustrates an example of a process flow of the storage system control program in the storage node of FIG. 4.

FIG. 11 illustrates an example of a process flow of the storage system control program 4007 in the storage node 1004 of FIG. 4. It receives requests (step 11001) from clients 1000, other nodes 1004, or the management server 1001. The received request is one of a write request from a client (steps 11002, 11010), a read request from a client (steps 11003, 11011), an internal write request from another node (steps 11004, 11012), an internal read request from another node (steps 11005, 11013), a prefetch request from another node (steps 11006, 11014), a table read request from the management server (steps 11007, 11015), a table update request from the management server or another node (steps 11008, 11016), or a file migration request from the management server (steps 11009, 11017). Otherwise, it returns an error message to the requestor (11018). If the storage system control program 4007 receives a table read request (step 11007), it sends the specified table to the requester (step 11015). If the storage system control program 4007 receives a table update request (step 11008), it updates the specified table with the specified value (step 11016). Details of other processes (steps 11010-11014, 11017) are described below.

Figure 12:
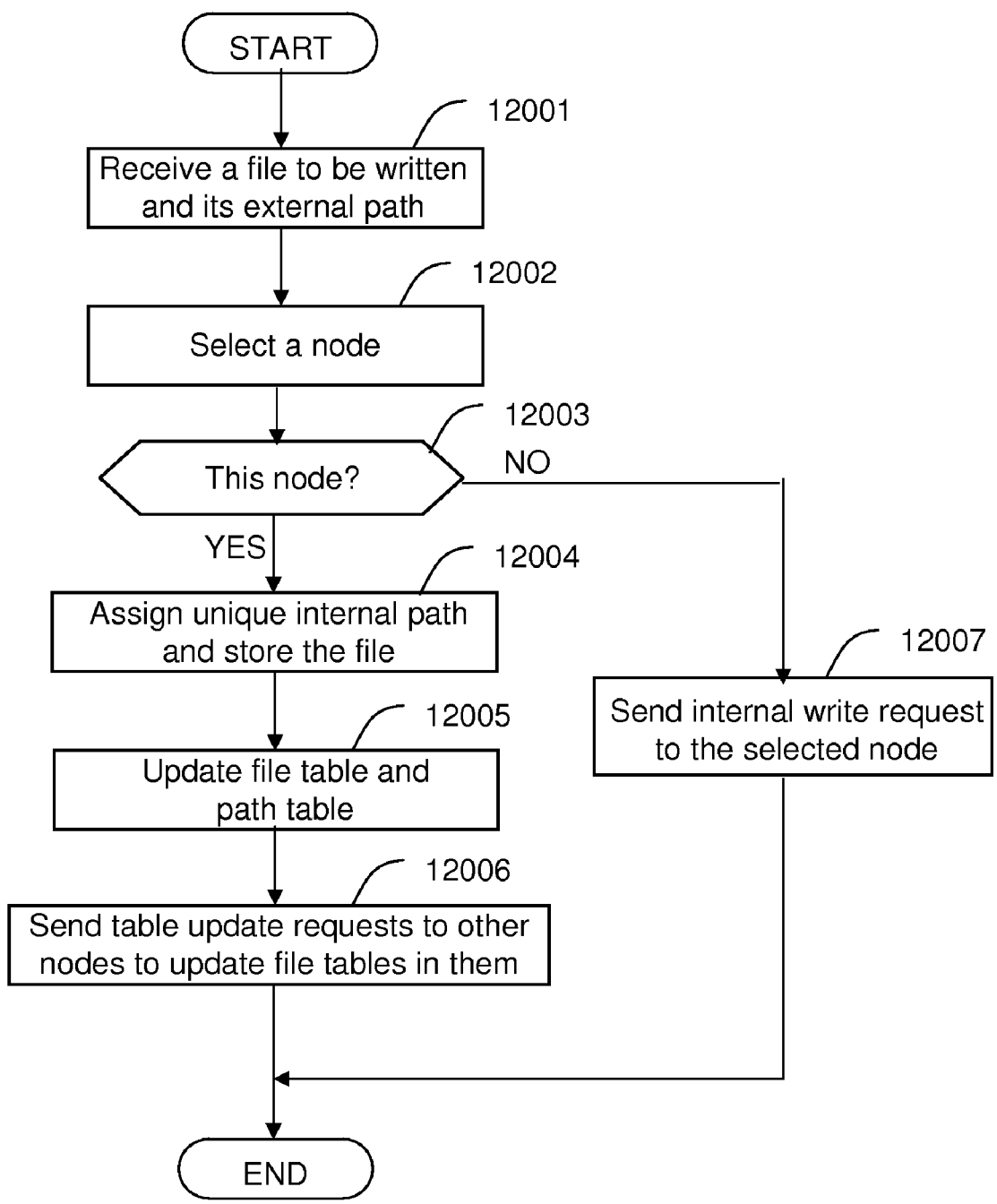
FIG. 12 illustrates an example of a process flow of a write request by the storage system control program in the storage node of FIG. 4.

FIG. 12 illustrates an example of a process flow of a write request by the storage system control program 4007 in the storage node 1004 of FIG. 4. When the storage system control program 4007 in a node receives a write request, it extracts a file to be stored and its external path from the request (step 12001). Next, it selects an owner node of the file. There are several methods to select a node 1004 in the storage system 1003. For example, the storage system control program 4007 can select a node which has the largest available capacity among the nodes. If the selected node is the receiver node itself (step 12003), it assigns a unique internal path to the file and stores it (step 12004). The path is recorded in the file table 4010 and path table 4011 (step 12005). The storage system control program 4007 also sends table update requests to other nodes to update the file tables in them (step 12006) so that all the file tables become identical. If the selected node is a different node, the storage system control program 4007 sends an internal write request which includes the file to be written and its external path to the selected node (step 12007).

Figure 13:
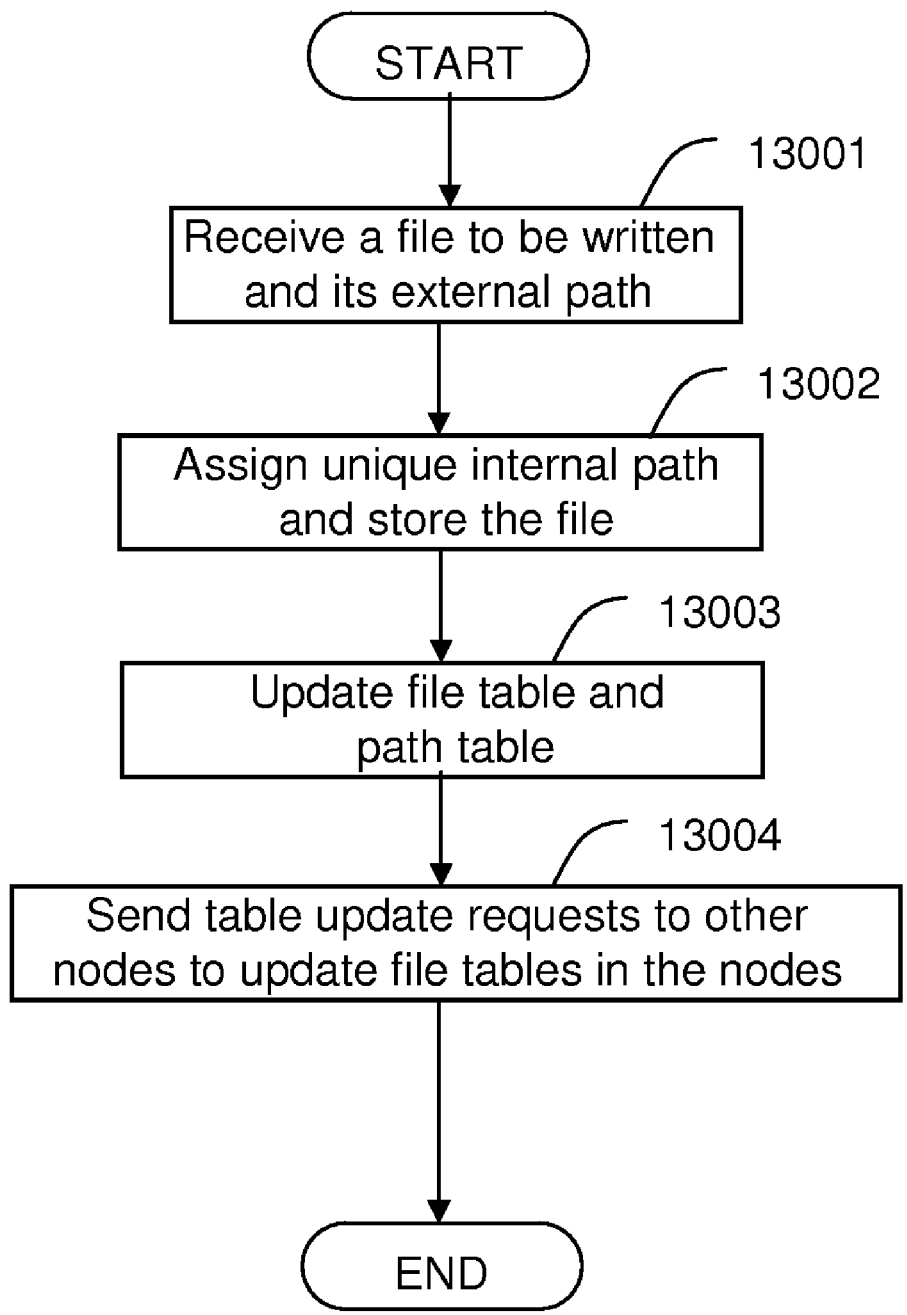
FIG. 13 illustrates an example of a process flow of an internal write request by the storage system control program in the storage node of FIG. 4.

FIG. 13 illustrates an example of a process flow of an internal write request by the storage system control program 4007 in the storage node 1004 of FIG. 4. If a node receives an internal write request, it extracts the file to be stored and its external path (step 13001). The remaining steps (13002-13004) are identical to steps 12004-12006 in FIG. 12.

Figure 14:
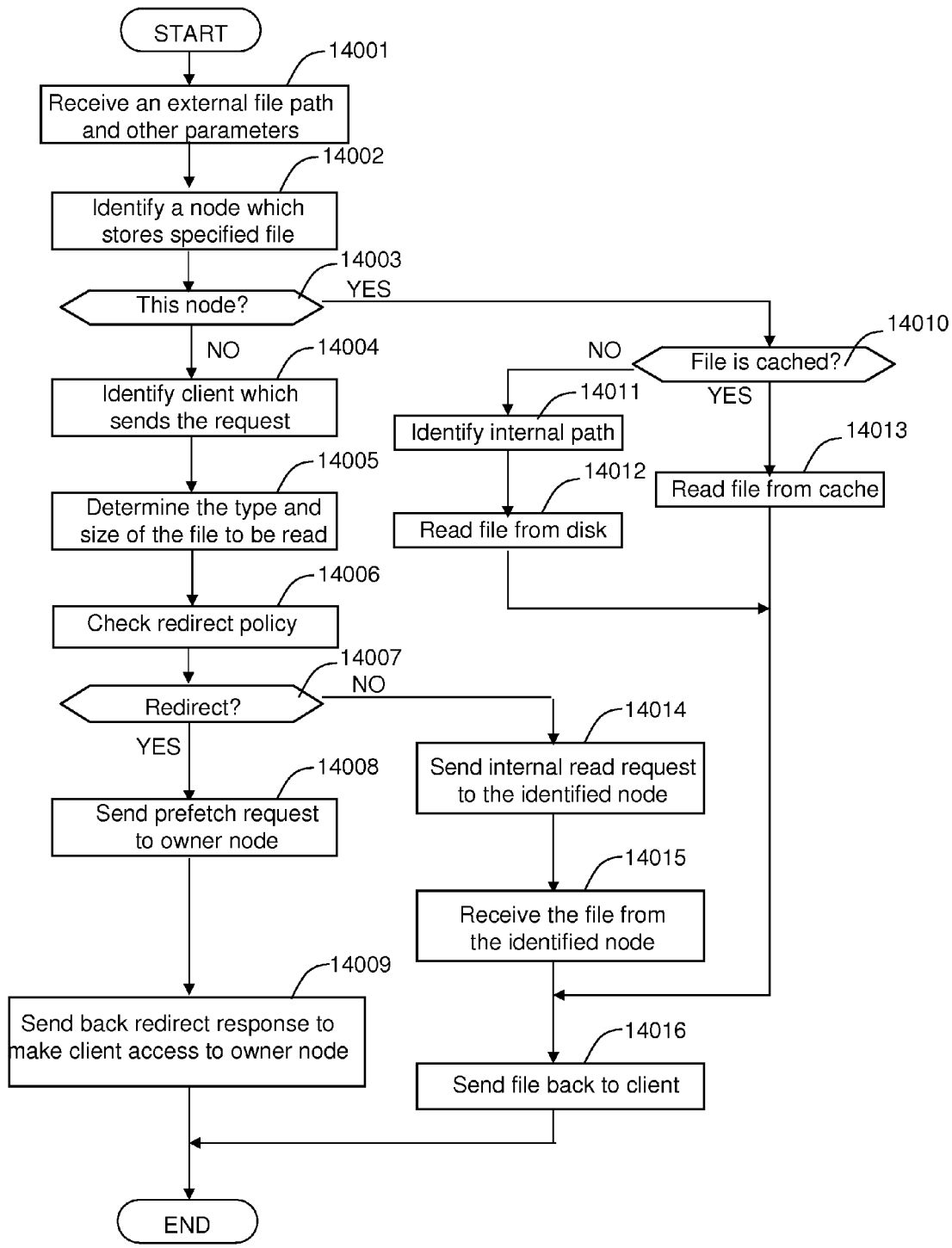
FIG. 14 illustrates an example of a process flow of a read request by the storage system control program in the storage node of FIG. 4.

FIG. 14 illustrates an example of a process flow of a read request by the storage system control program 4007 in the storage node 1004 of FIG. 4. When the storage system control program 4007 receives a read request, it extracts an external path of the file to be read and other parameters including HTTP header fields in the request (step 14001). Next, it identifies an owner node which stores the specified file (step 14002). If the owner node is the receiver node itself (step 14003), the storage system control program 4007 checks whether the file is cached in memory by looking up the cache table 4012 (step 14010). If it is cached, the file is read from cache (step 14013). Otherwise, the storage system control program 4007 identifies an internal path of the file by looking up the path table 4011 (step 14011) and reads it from disk (step 14012). Subsequently, the storage system control program 4007 sends the file to the client 1000 that made the request (step 14016). If the owner node is not the receiver node, the storage system control program 4007 identifies the client which sends the read request (step 14004) and determines the type and size of the requested file (step 14005). Based on this information in addition to what is extracted in step 14001, the storage system control program 4007 determines whether or not the request should be redirected by looking up the policy table 4008 (step 14006). If there is a policy whose conditions match the request and its entry of redirect instruction recorded in column 5006 is "Yes" (step 14007), the storage system control program 4007 sends a prefetch request which specifies the file to be prefetched in cache to the owner node of the file (step 14008) and sends back a redirect response to the client that made the request (step 14009). The response has HTTP response code 302, 303, or 307 which makes the client access specified URL in Location field and Location header field whose value is the originally requested URL, but the host part is replaced by the IP address of the owner node which can be obtained by looking up the node table 4009. For example, a redirect response has a header shown below:
HTTP/1.1 303 See Other
Location: http://<IP address of owner node>/<external path of the file>
If the redirect instruction of the matched policy is "No" or if no policy is matched, the storage system control program 4007 sends an internal read request to the owner node (step 14014) and receives the file from the owner node (step 14015). Finally, it sends the file to the client (step 14016).

Figure 15:
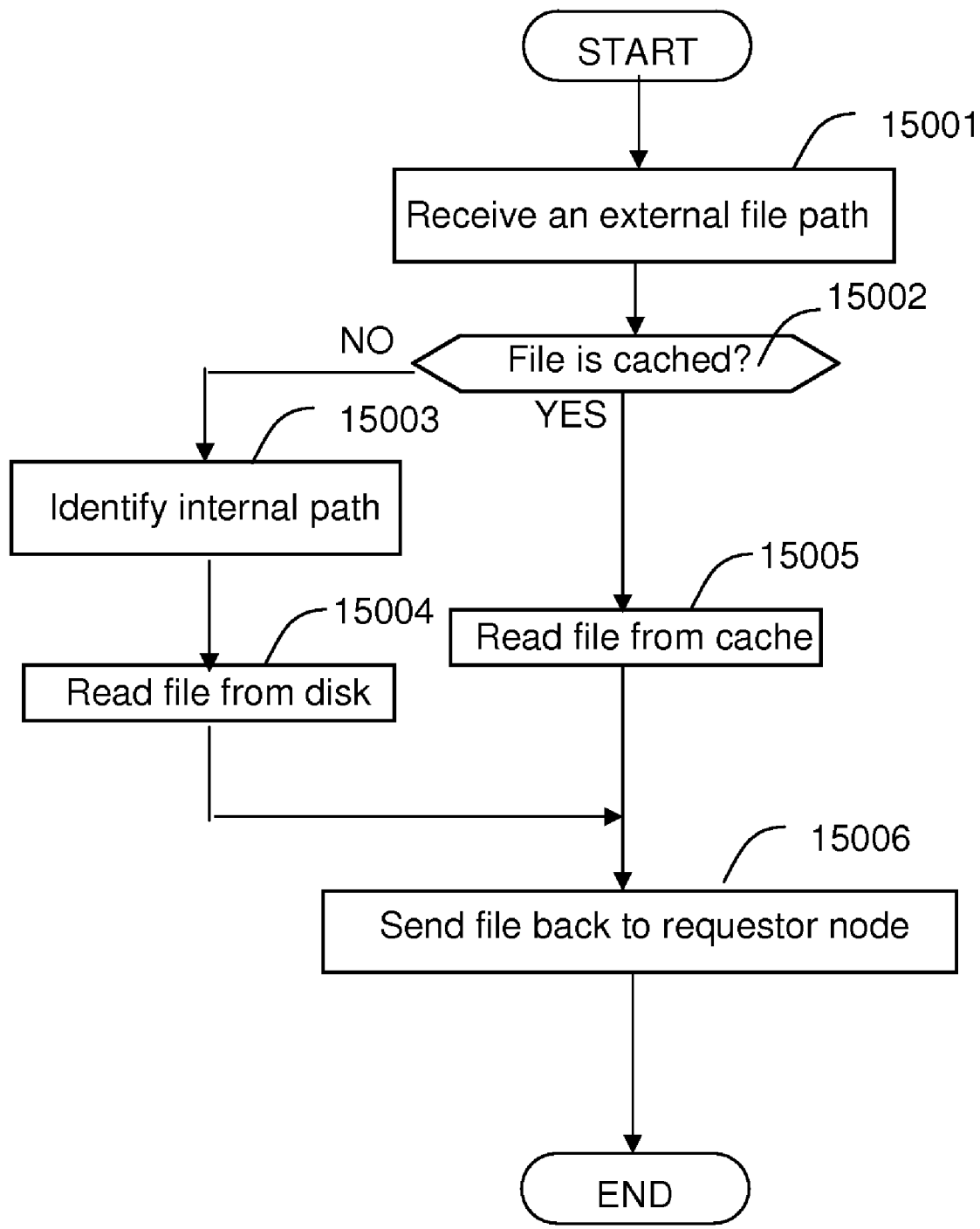
FIG. 15 illustrates an example of a process flow of an internal read request by the storage system control program in the storage node of FIG. 4.

FIG. 15 illustrates an example of a process flow of an internal read request by the storage system control program 4007 in the storage node 1004 of FIG. 4. When the storage system control program 4007 receives an internal read request from another node, it extracts an external path of the file to be read (step 15001) and reads the specified file from cache or disk (steps 15002-15005). These steps are identical to steps 14010-14013 in FIG. 14. Subsequently, the storage system control program 4007 sends the file to the node which sends the internal read request (step 15006).

Figure 16:
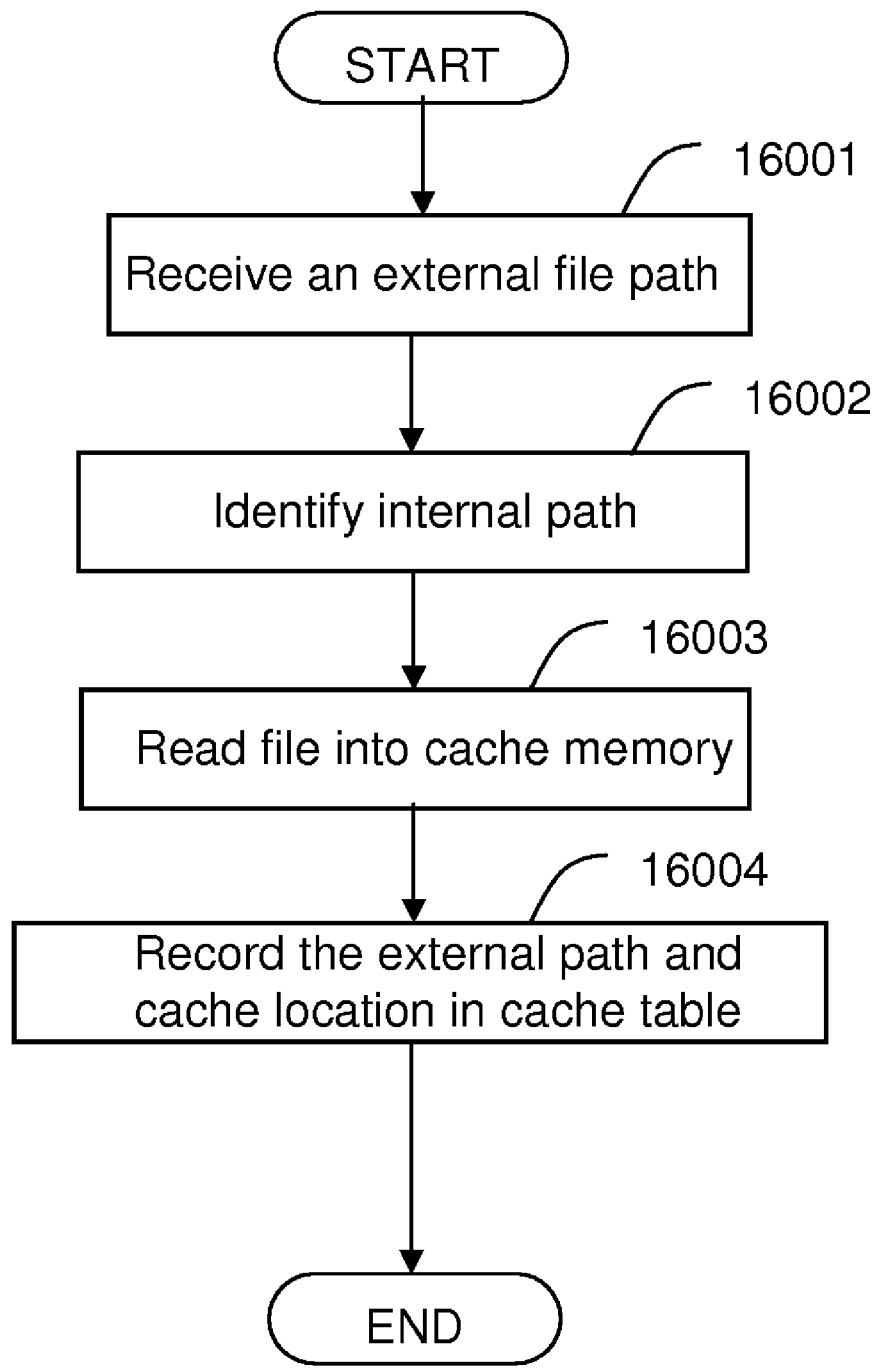
FIG. 16 illustrates an example of a process flow of a prefetch request by the storage system control program in the storage node of FIG. 4.

FIG. 16 illustrates an example of a process flow of a prefetch request by the storage system control program 4007 in the storage node 1004 of FIG. 4. When the storage system control program 4007 receives a prefetch request from another node, it extracts an external path of the file to be read (step 16001), identifies its internal path by looking up the path table 4011 (step 16002), and reads the specified file from disk into cache memory (step 16003). It also records the location of the cache memory in the cache table 4012 (step 16004).

Figure 17:
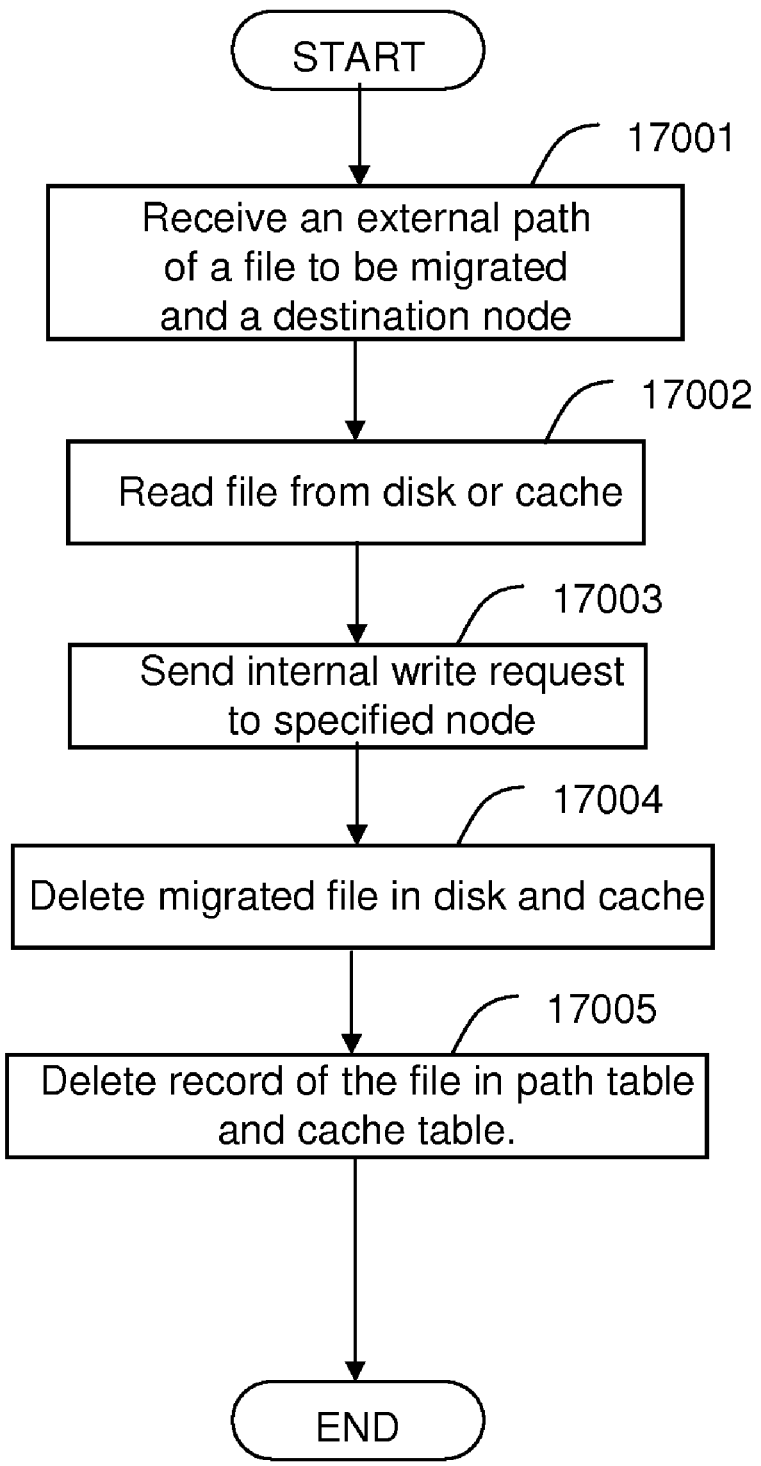
FIG. 17 illustrates an example of a process flow of a file migration request by the storage system control program in the storage node of FIG. 4.

FIG. 17 illustrates an example of a process flow of a file migration request by the storage system control program 4007 in the storage node 1004 of FIG. 4. When the storage system control program 4007 receives a file migration request from the management server, it extracts an external path of the file to be migrated and an ID of the destination node in the request (step 17001), and reads the specified file from cache or disk (step 17002). Step 17002 is the same as process steps 14010-14013 in FIG. 14 or steps 15002-15005 in FIG. 15. Next, the storage system control program 4007 sends an internal write request which contains the file and its external path to the destination node (step 17003). It deletes the file stored in disk and cache (step 17004). Finally, it also deletes records of the deleted file in the path 4011 table and the cache table 4012 (step 17005). This process migrates a file from one node to another by making a new copy of the file in the destination node and deleting the file in the original node. File tables 4010 are updated by the destination node as a part of the process of internal write request. This process maintains the file table 4010 and the path table 4011 correctly even if a file is migrated between nodes so that a redirect response always contains the correct Location header field value.

In this embodiment, the switch of the path from a client to the owner node of a file to be read is achieved by specifying a response code in standard HTTP. It is also possible, however, to use some other standard or proprietary communication protocol to provide to the client an appropriate path to the file provided that the client can support and recognize the redirection mechanism.

In a second embodiment as shown in FIGS. 18-21, when a node 1004 receives a file to be stored in the storage system 1003 from a client, it determines whether or not a read request to the file should be redirected to its owner node based on predetermined policies and records it as a redirection flag in the file table 4010. When a node 1004 receives a request to read the file, it checks the redirection flag entry and determines whether to redirect the request based on the redirection flag entry. The differences between the second embodiment and the first embodiment are described below.

FIG. 18 illustrates an exemplary file table 4010 according to the second embodiment. The file table 4010 has a column 18003 which records the redirection flag. "Yes" in this column means that a read request to the file should be redirected to its owner node. "No" means it should not be redirected.

Figure 19:
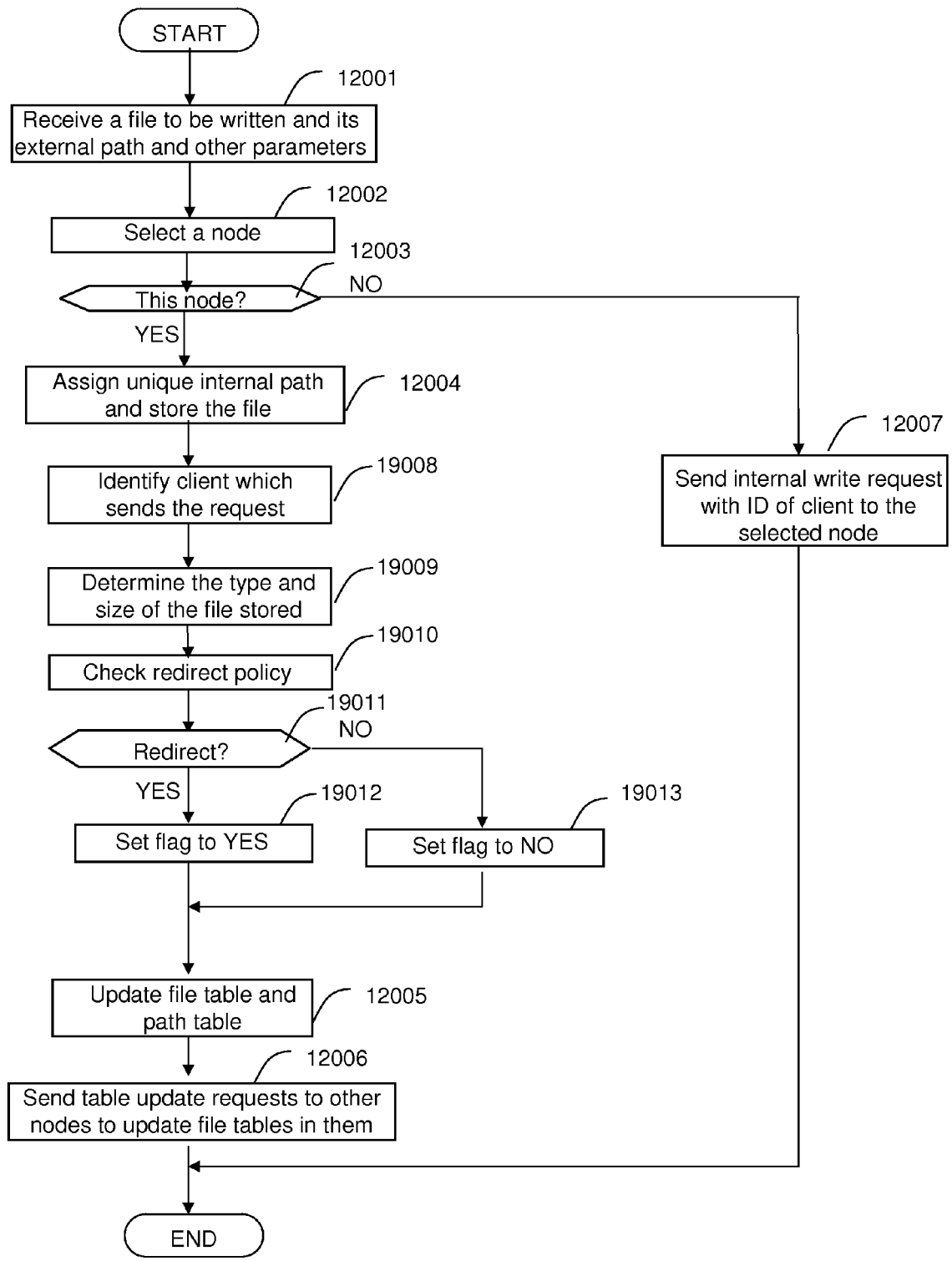
FIG. 19 illustrates an example of a process flow of a write request by the storage system control program in the storage node according to the second embodiment of the invention.

FIG. 19 illustrates an example of a process flow of a write request by the storage system control program 4007 in the storage node 1004. As compared with FIG. 12 in the first embodiment, steps 19008-19013 are inserted between step 12004 and step 12005. In step 19008, the program identifies the client which sends the request. In step 19009, it determines the type and size of the file stored. The program then checks the redirect policy (step 19010) to ascertain whether to redirect the access request (step 19011). These additional steps (19008-19011) determine, based on the information about the file stored and the predetermined policies, whether or not a read request to the file should be redirected. The determined value is recorded as a redirect flag of the file in the file table 4010 of FIG. 18 as "yes" (step 19012) or "no" (step 19013). The updated file table 4010 including the flag is shared by all the nodes (step 12006).

Figure 20:
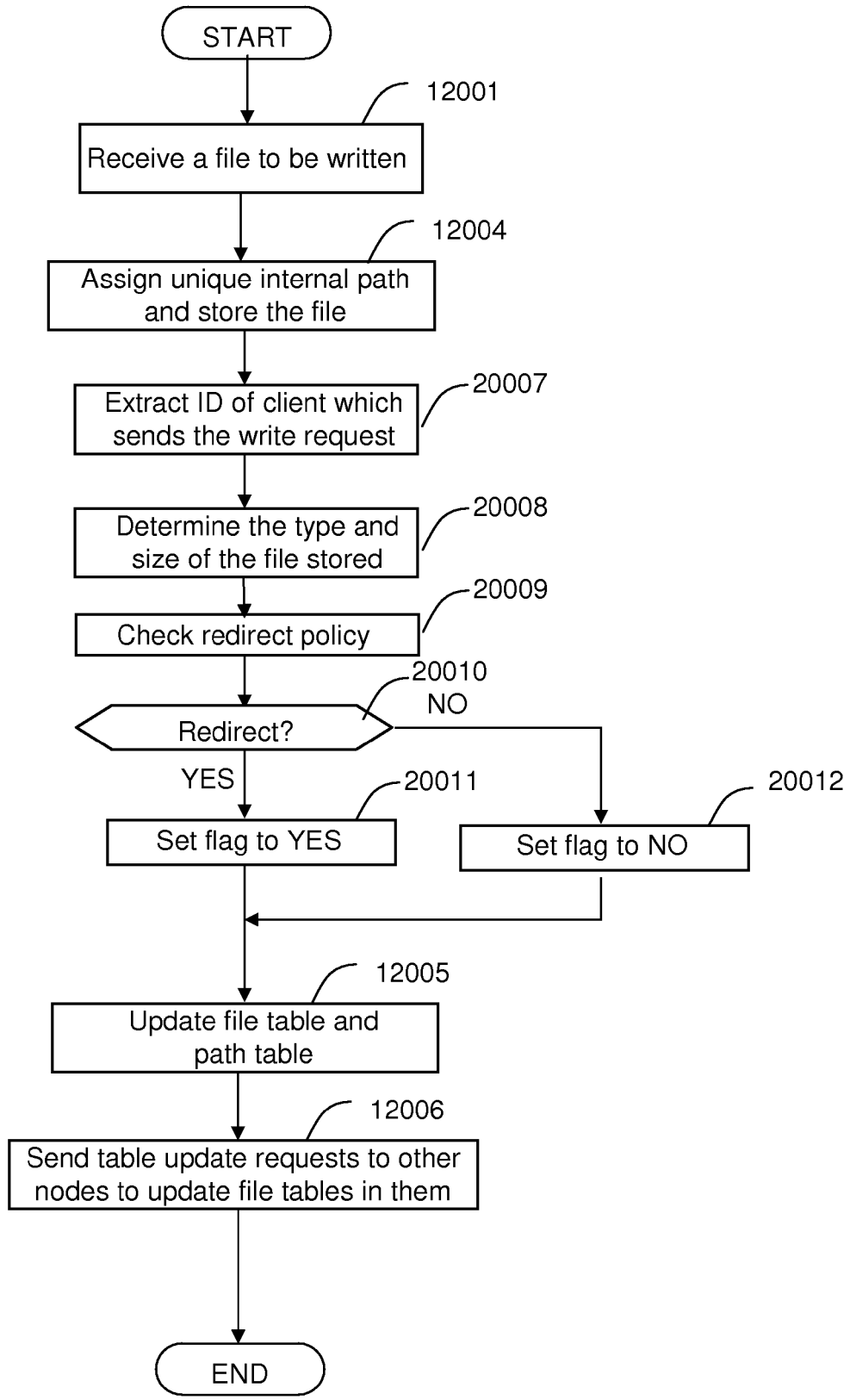
FIG. 20 illustrates an example of a process flow of an internal write request by the storage system control program in the storage node according to the second embodiment of the invention.

FIG. 20 illustrates an example of a process flow of an internal write request by the storage system control program 4007 in the storage node 1004 according to the second embodiment. As shown in FIG. 20, the same additional steps as steps 19008-19013 in FIG. 19 are inserted in the process flow of the internal write request as steps 20007-20012, as compared with FIG. 13 of the first embodiment, so that the redirection flag is recorded in the file table 4010.

Figure 21:
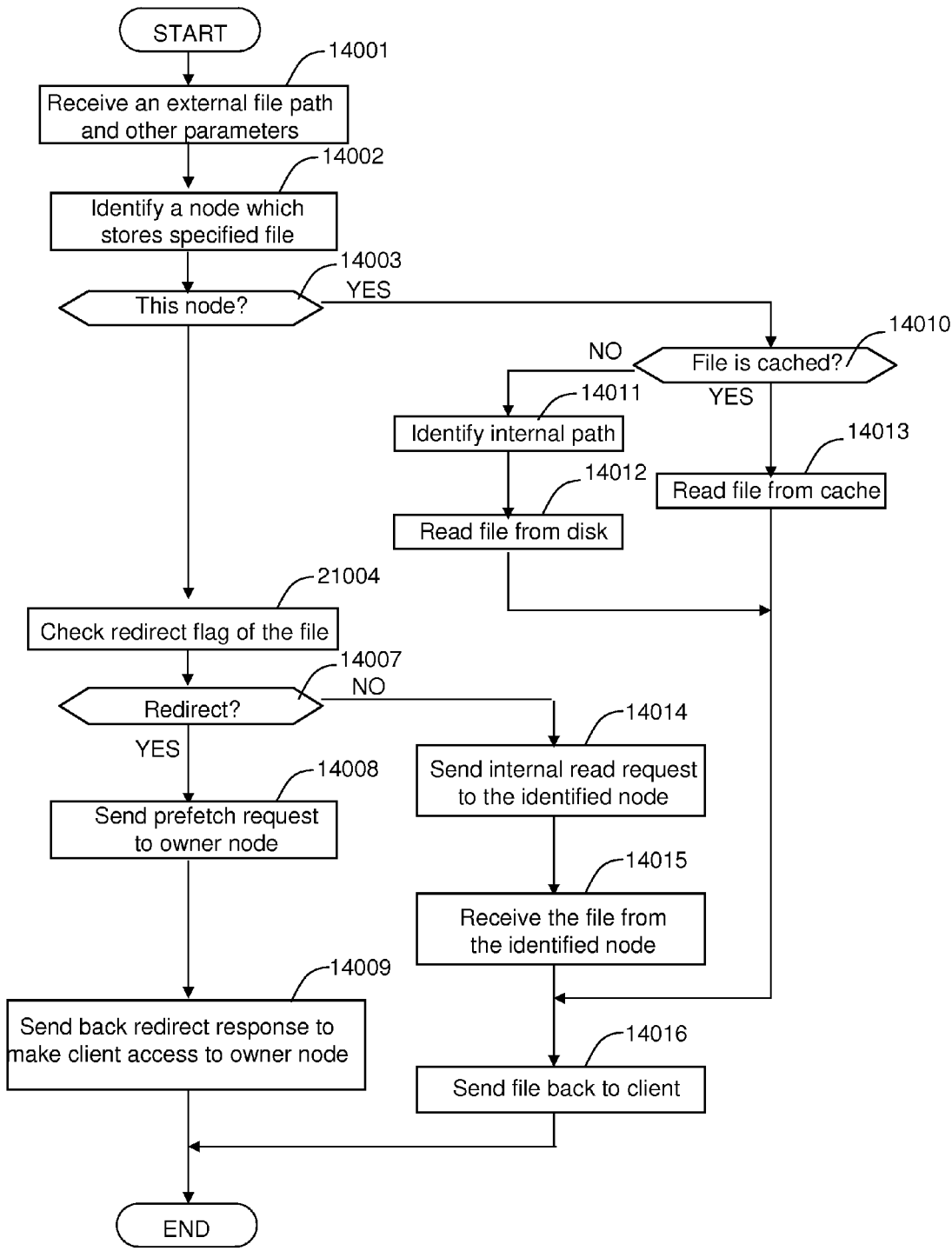
FIG. 21 illustrates an example of a process flow of a read request by the storage system control program in the storage node according to the second embodiment of the invention.

FIG. 21 illustrates an example of a process flow of a read request by the storage system control program 4007 in the storage node 1004. As comparing with FIG. 14 in the first embodiment, steps 14004-14006 which check a number of conditions for each redirect policy are replaced by step 21004 which only checks the redirection flag of the file. In the second embodiment, the process to determine whether or not a read request should be redirected is simplified by shifting some of the determination steps included in processing the read request according to the first embodiment to steps in processing the write request according to the second embodiment at the time the file is stored, so that the latency of file transfer is decreased in processing the read request. Furthermore, it is also possible to use this method together with the method disclosed in the first embodiment to manage the redirection conditions more flexibly.

In the third embodiment as shown in FIGS. 22-26, a file is divided into multiple portions and each portion is stored in one of the nodes 1004 so that a client can read different portions of the file from a number of nodes simultaneously to increase the throughput. When a node 1004 tells a client 1000 to switch the path, it sends the information of the location of each file portion. When the path should not be changed, a node collects the file portions from other nodes, organizes them as a file, and sends it to the client. The differences between the third embodiment and the first embodiment are described below.

FIG. 22 illustrates an exemplary file table 4010 in the storage node 1004 according to the third embodiment. A file is divided into portions and each portion has its external path (portion path column 22003). The external path of a portion is created by the storage system control program 4007 when the portion is created. For example, as shown in FIG. 22, an external path of a portion is created by adding sequential numbers for sequential portions to the external path of the original file. The location of the portion in the original file is also recorded (range column 22004). Each portion has its owner node (owner node column 22005) because the portions are distributed among the nodes.

Figure 23:
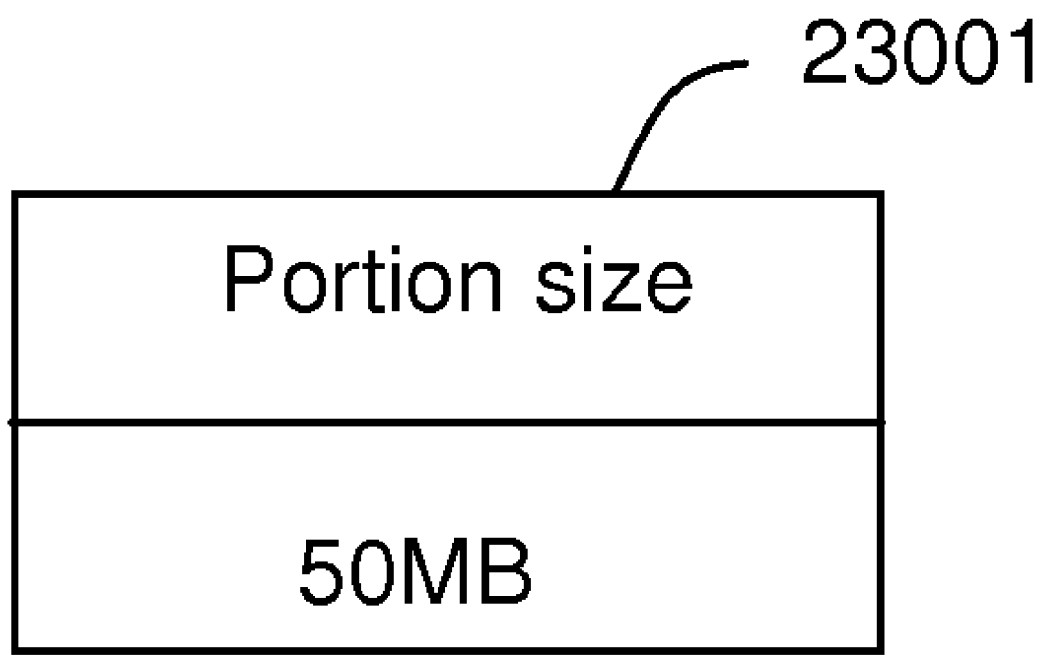
FIG. 23 illustrates an exemplary portion size table in the storage node according to the third embodiment of the invention.

FIG. 23 illustrates an exemplary portion size table 23001 in the storage node 1004 which is a new table according to the third embodiment. The portion size table 23001 is stored in the memory 4003. A file is divided into portions so that the size of each portion is equal to or less than the size specified in this table.

Figure 24:
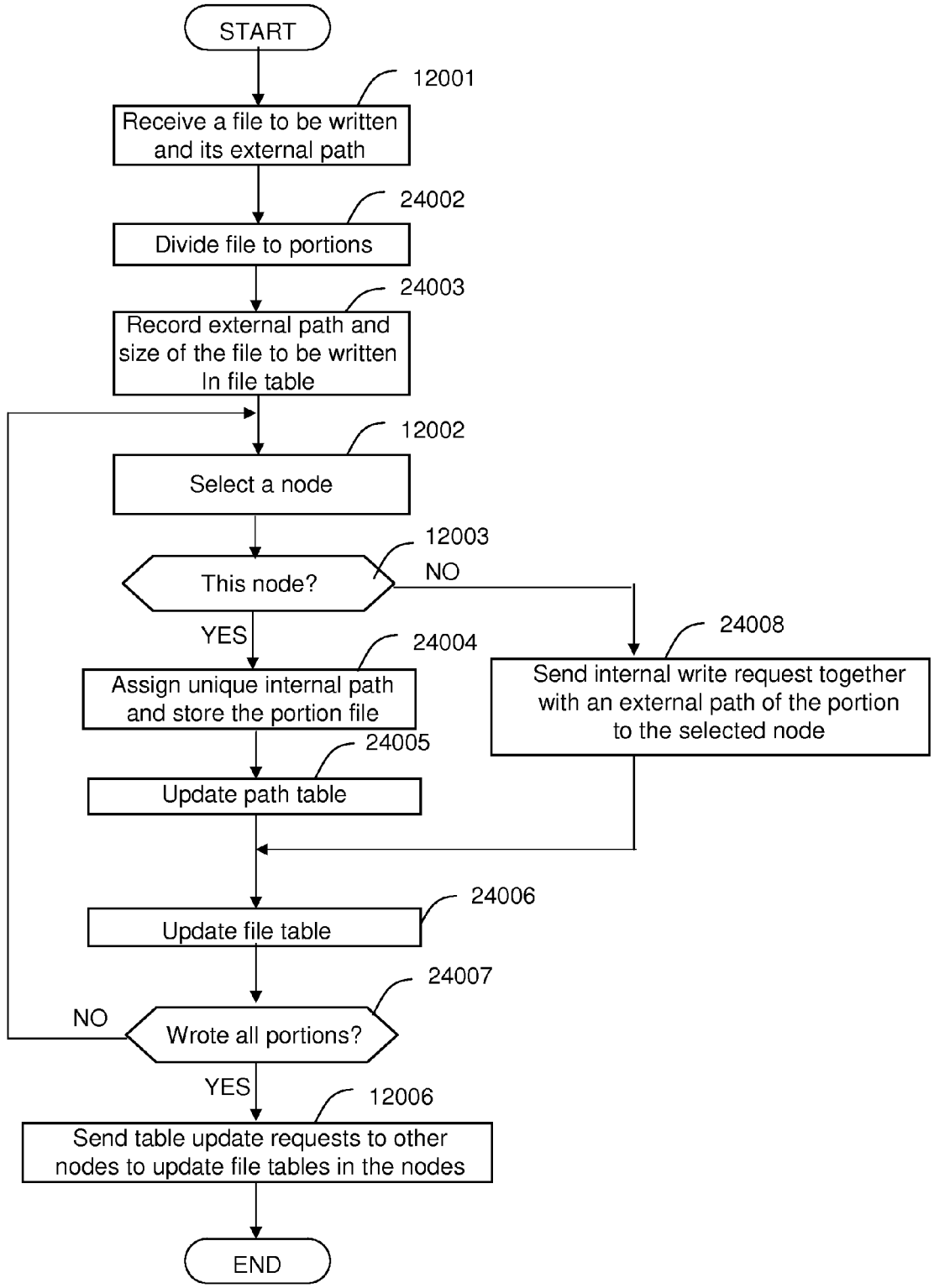
FIG. 24 illustrates an example of a process flow of a write request by the storage system control program in the storage node according to the third embodiment of the invention.

FIG. 24 illustrates an example of a process flow of a write request by the storage system control program 4007 in the storage node 1004 according to the third embodiment. As compared with FIG. 12 of the first embodiment, steps 24002 and 24003 are inserted between step 12001 and step 12002, while steps 24004-24008 in FIG. 24 replace steps 12004, 12005, and 12007 in FIG. 12. In step 24002, the file to be stored is divided into portions based on the size recorded in the portion size table 23001 and external path names for the portions are generated. In step 24003, the external path and size of the file to be stored is recorded in column 7001 and 7002 in the file table 4010. For each portion, the storage system control program 4007 selects an owner node (step 12002). If the selected node is not the receiver node itself, the storage system control program 4007 sends an internal write request to the node to write the portion (step 24008). Otherwise, it stores the portion as an internal file and records the internal path in the path table 4011 (steps 24004 and 24005). For each portion stored, the storage system control program 4007 records its external path, its range in the original file, and its owner node in the file table 4010 (step 24006). These steps are repeated until all the portions are stored (step 24007). Finally, the storage system control program 4007 sends table update requests to other nodes to update their file tables 4010 (step 12006).

Figure 25:
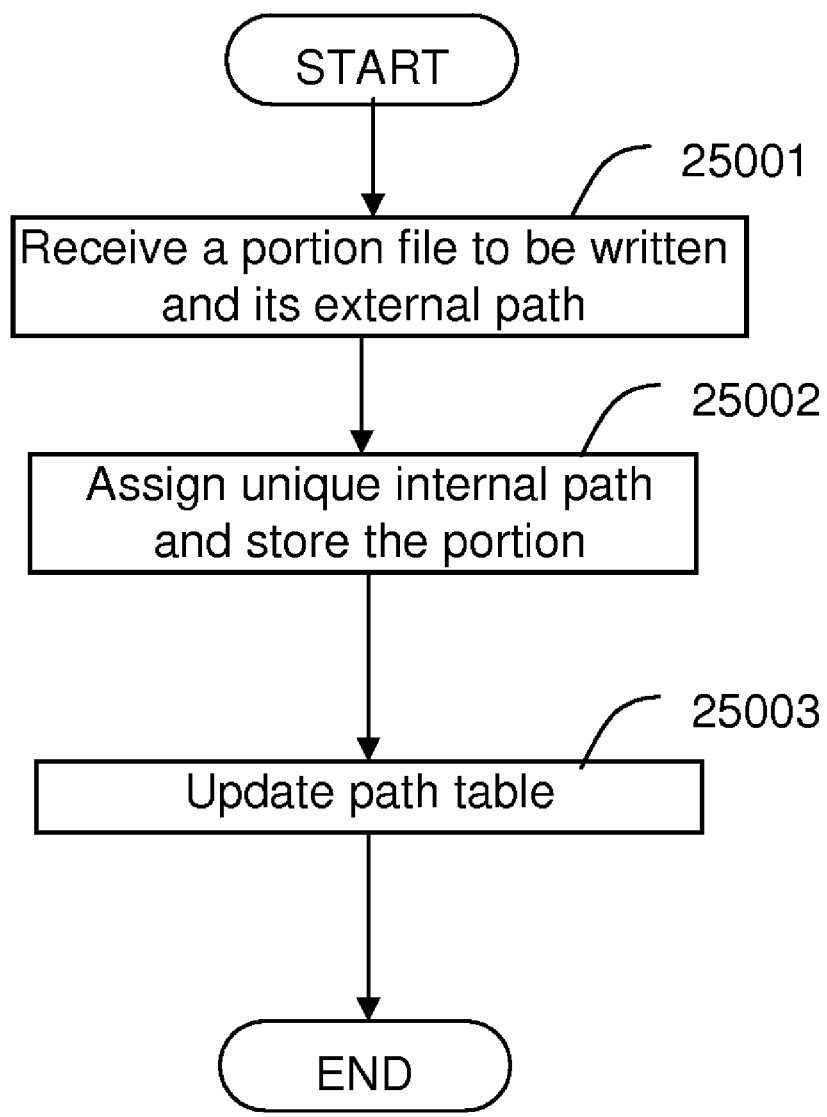
FIG. 25 illustrates an example of a process flow of an internal write request by the storage system control program in the storage node according to the third embodiment of the invention.

FIG. 25 illustrates an example of a process flow of an internal write request by the storage system control program 4007 in the storage node 1004 according to the third embodiment. The storage system control program 4007 receives a portion file to be written and its external path (step 25001), stores the portion as an internal file (step 25002), and records its external and internal path in the path table 4011 (step 25003). Unlike the first embodiment in which file table is updated by an owner node of a file to be stored, in this embodiment, the file table is updated by the receiver node of a write request.

Figure 26:
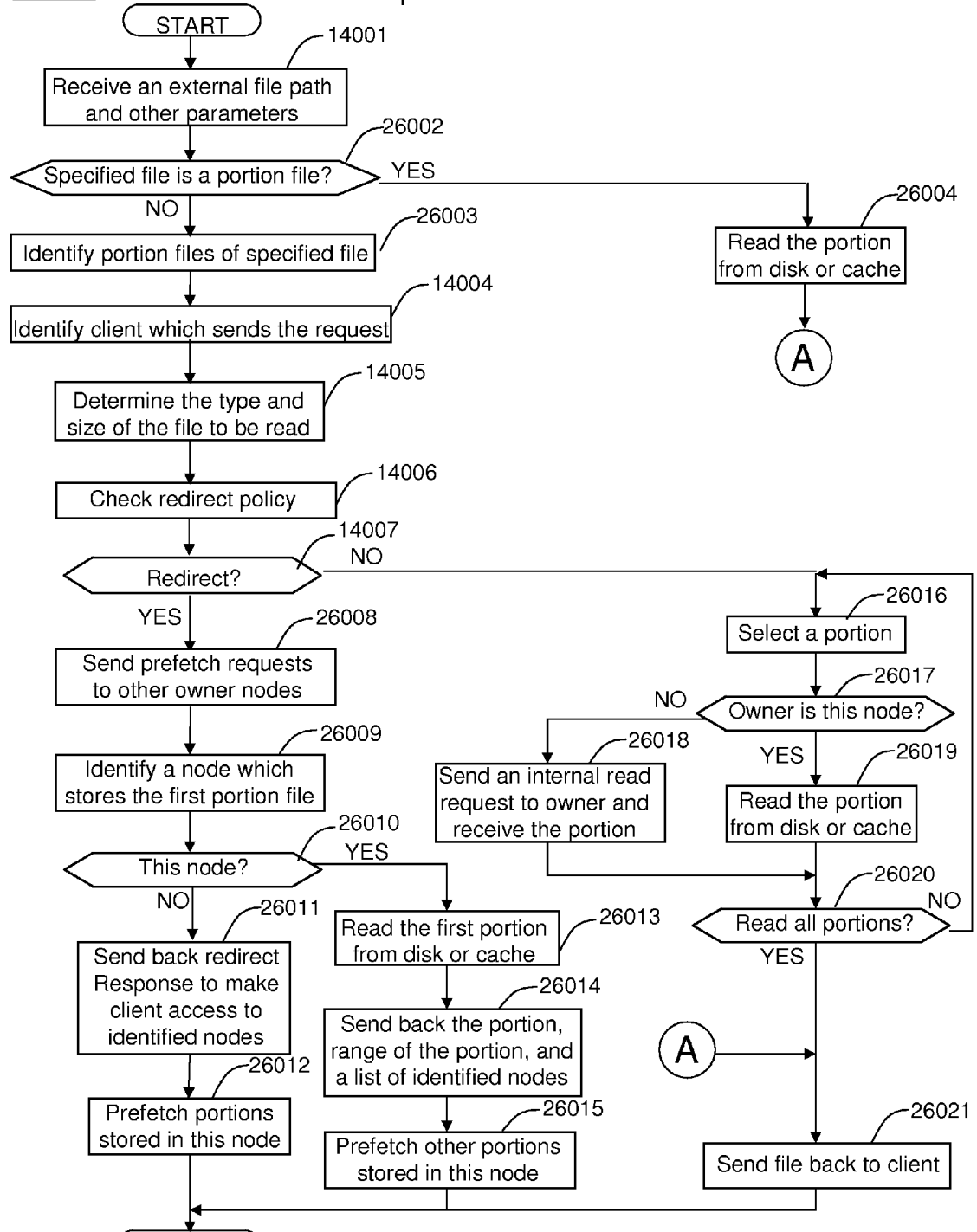
FIG. 26 illustrates an example of a process flow of a read request by the storage system control program in the storage node according to the third embodiment of the invention.

FIG. 26 illustrates an example of a process flow of a read request by the storage system control program 4007 in the storage node 1004 according to the third embodiment. As compared to FIG. 14 of the first embodiment, steps 26002-26004 replace steps 14002-14003 in FIG. 14, and steps 26008-26021 replace steps 14008-14016. If the external path of a specified file is recorded as a portion of a file in the file table 4010 (step 26002), the storage system control program 4007 reads the portion file (step 26004) and sends it to the client (step 26021). Otherwise, it identifies an owner node by looking up the file table 4010 for each portion of the file to be read (step 26003). The program identifies the client which sends the request (step 14004), determines the type and size of the file to be read (step 14005), and checks the redirect policy (step 14006). If it is determined to redirect the request (step 14007), the storage system control program 4007 sends prefetch requests to the owner nodes other than itself to prefetch portions in cache (step 26008). If the owner node of the first portion of the file is the receiver node itself (steps 26009 and 26010), the storage system control program 4007 reads the first portion (step 26013) and sends back the portion and the information about the portions (step 26014). For example, the information can be composed as a part of HTTP response header shown below:
HTTP/1.1 206 Partial Content
Content-Range: bytes 0-49999999/500000000
Content-Length: 50000000
X-Number-of-portions: 4
X-Portion-Location1: http://<owner node of 1st portion>/<external path of 1st portion>
X-Portion-Range1: 0-49999999
X-Portion-Location2: http://<owner node of 2nd portion>/<external path of 2nd portion>
X-Portion-Range2: 50000000-99999999

The X-Number-Length field contains the number of portions of the requested file. The X-Portion-Location<N> field contains the URL of the Nth portion of the file. The X-Portion-Range<N> field contains the range of the Nth portion in the original file. The body of the response contains the portion of the file. By referring to these header fields, the client 1000 can understand how the file is divided and the appropriate paths to the portions. Finally, the storage system control program 4007 prefetches any other portions stored in the node (step 26015) so that it can reduce the latency to process read requests to the portion files.

If the first portion is not stored in the receiver node, the storage system control program 4007 sends a redirect response back to the client 1000 (step 26011) to provide the client with the information about the portions. For example, the information can be composed as a part of an HTTP response header shown below:
HTTP/1.1 303 See Other
Location: http://<owner node of 1st portion>/<external path of 1st portion>
X-Number-of-portions: 4
X-Portion-Location1: http://<owner node of 1st portion>/<external path of 1st portion>
X-Portion-Range1: 0-49999999
X-Portion-Location2: http://<owner node of 2nd portion>/<external path of 2nd portion>
X-Portion-Range2: 50000000-99999999

The response code can also be 302 or 307. This response redirects the request to the URL of the first portion. Finally, the storage system control program 4007 prefetches the portions stored in the node (step 26012).

If it is determined not to redirect the request (step 14007), for each portion (step 26016), the storage system control program 4007 reads it from cache or disk (step 26019) if it is stored in the receiver node (step 26017), or sends an internal read request specifying its external path to its owner node and receives the portion from the owner node (step 26018). After the program obtains all the portions (step 26020), it organizes them into the original file and sends it to the client (step 26021).

In this embodiment, a file is divided into portions and stored in a number of nodes. A client can read the divided file by a single read request. Also, a client can request each portion by sending individual read requests to increase the throughput because the information regarding the portions is sent from the storage system to the client based on predetermined policies.

From the foregoing, it will be apparent that the invention provides methods, apparatuses and programs stored on computer readable media for improving the performance of a distributed storage system that provides single name space to clients. Additionally, while specific embodiments have been illustrated and described in this specification, those of ordinary skill in the art appreciate that any arrangement that is calculated to achieve the same purpose may be substituted for the specific embodiments disclosed. This disclosure is intended to cover any and all adaptations or variations of the present invention, and it is to be understood that the terms used in the following claims should not be construed to limit the invention to the specific embodiments disclosed in the specification. Rather, the scope of the invention is to be determined entirely by the following claims, which are to be construed in accordance with the established doctrines of claim interpretation, along with the full range of equivalents to which such claims are entitled.

What is claimed is:

1. A system for providing access to files in a distributed storage system, the system comprising:
   a plurality of storage nodes and at least one computer device connected via a network;
   wherein each storage node is configured, upon receiving a file access request for a file from one of the at least one computer device as a receiver storage node, to determine whether or not to inform the computer device making the file access request to redirect the file access request to an owner storage node of the file according to a preset policy;
wherein the preset policy defines conditions for whether to redirect the file access request based on at least one of file type or file size of the file; and
wherein the receiver storage node is configured, in not redirecting the file access request to the owner storage node, to read the file from the owner storage node and send the read file to the computer device making the file access request.

2. A system according to claim 1, wherein the receiver storage node is configured, in redirecting the file access request to the owner storage node, to send a prefetch request to the owner storage node specifying the file to be prefetched in cache.

3. A system according to claim 1, wherein the receiver storage node determines whether or not to inform the computer device making the file access request to redirect the file access request to the owner storage node by looking up a policy table which specifies the conditions for whether to redirect the file access request based on at least one of file type or file size of the file.

4. A system according to claim 3, wherein the conditions are based on both the file type and the file size of the file, and further based on at least one of the computer device requesting the file, an external path of the file, or at least one request parameter specified in the file access request.

5. A system according to claim 3, wherein the policy table is stored in each of the storage nodes.

6. A system according to claim 1, wherein the receiver storage node determines whether or not to inform the computer device making the file access request to redirect the file access request to the owner storage node by looking up a redirection flag for the file, the redirection flag specifying, for each file stored in the storage nodes, whether a file access request for the file associated therewith is to be redirected.

7. A system according to claim 6, wherein the redirection flag is set by performing the following at the time when a file is written into one of the storage nodes:
determining whether or not to redirect a file access request to an owner storage node of the file according to the preset policy based on at least one of the file type or the file size of the file; and
setting the redirection flag to redirect or not to redirect according to the determining step.

8. A system according to claim 1,
wherein the file of the file access request is divided into multiple portions and stored in a plurality of the storage nodes, and
wherein each storage node is configured, as the receiver storage node, to determine whether or not to inform the computer device making the file access request to redirect the file access request to owner storage nodes of the multiple portions of the file according to the preset policy.

9. A system according to claim 8, wherein the receiver storage node is configured, in redirecting the file access request to the owner storage nodes of the multiple portions of the file, to send a prefetch request to each owner storage node, other than the receiver storage node, specifying the portion of the file to be prefetched in cache.

10. A system according to claim 1, wherein each storage node is configured, upon receiving a migration request to migrate a file to a destination storage node, to extract an external path of the file to be migrated, read the file from an origination storage node, send an internal write request which includes the file and the external path of the file to the destination storage node, delete the migrated file from the origination storage node, and update a location record of the migrated file within the distributed storage system.

11. A system according to claim 1, wherein the preset policy defines conditions for whether to redirect the file access request based on at least one of the file type of the file, the file size of the file, the computer device requesting the file, an external path of the file, or at least one request parameter specified in the file access request.

12. In a system having a distributed storage system and at least one computer device connected via a network, a method of providing access to files in a plurality of storage nodes in the distributed storage system, the method comprising:
upon receiving a file access request for a file from one of the at least one computer device, determining whether or not to inform the computer device making the file access request to redirect the file access request to an owner storage node of the file according to a preset policy;
wherein the preset policy defines conditions for whether to redirect the file access request based on at least one of file type or file size of the file; and
wherein determining whether or not to inform the computer device making the file access request to redirect the file access request to the owner storage node comprises looking up a redirection flag for the file, the redirection flag specifying, for each file stored in the storage nodes, whether a file access request for the file associated therewith is to be redirected.

13. A method according to claim 12, further comprising, if it is determined to redirect the file access request to the owner storage node, sending a prefetch request to the owner storage node specifying the file to be prefetched in cache.

14. A method according to claim 12, wherein determining whether or not to inform the computer device making the file access request to redirect the file access request to the owner storage node comprises looking up a policy table which specifies the conditions for whether to redirect the file access request based on at least one of file type or file size of the file.

15. A method according to claim 12, further comprising setting the redirection flag by performing the following at the time when a file is written into one of the storage nodes:
determining whether or not to redirect a file access request to an owner storage node of the file according to the preset policy based on at least one of the file type or the file size of the file; and
setting the redirection flag to redirect or not to redirect according to the determining step.

16. A method according to claim 12,
wherein the file of the file access request is divided into multiple portions and stored in a plurality of the storage nodes, and
wherein the determining step includes determining whether or not to inform the computer device making the file access request to redirect the file access request to owner storage nodes of the multiple portions of the file according to the preset policy.

17. A method according to claim 12, further comprising, upon receiving a migration request to migrate a file to a destination storage node:
extracting an external path of the file to be migrated;
reading the file from an origination storage node;
sending an internal write request which includes the file and the external path of the file to the destination storage node;
deleting the migrated file from the origination storage node; and updating a location record of the migrated file within the distributed storage system.

18. A method according to claim 12, wherein the preset policy defines conditions for whether to redirect the file access request based on at least one of the file type of the file, the file size of the file, the computer device requesting the file, an external path of the file, or at least one request parameter specified in the file access request.

19. A system for providing access to files in a distributed storage system, the system comprising:

a plurality of storage nodes and at least one computer device connected via a network;

wherein each storage node is configured, upon receiving a file access request for a file from one of the at least one computer device as a receiver storage node, to determine whether or not to inform the computer device making the file access request to redirect the file access request to an owner storage node of the file according to a preset policy;

wherein the preset policy defines conditions for whether to redirect the file access request based on at least one of file type or file size of the file; and wherein each storage node is configured, upon receiving a migration request to migrate a file to a destination storage node, to extract an external path of the file to be migrated, read the file from an origination storage node, send an internal write request which includes the file and the external path of the file to the destination storage node, delete the migrated file from the origination storage node, and update a location record of the migrated file within the distributed storage system.

20. A system according to claim 1, wherein the receiver storage node determines whether or not to inform the computer device making the file access request to redirect the file access request to the owner storage node by looking up a redirection flag for the file, the redirection flag specifying, for each file stored in the storage nodes, whether a file access request for the file associated therewith is to be redirected.

* * * * *